United States Patent
Krock et al.

[11] 3,920,702
[45] Nov. 18, 1975

[54] ANTHRAQUINONE DYESTUFFS
[75] Inventors: Friedrich Wilhelm Kröck, Opladen; Rütger Neeff, Leverkusen, both of Germany
[73] Assignee: Bayer Aktiengesellschaft, Leverkusen-Bayerwerk, Germany
[22] Filed: Aug. 9, 1973
[21] Appl. No.: 386,888

[30] Foreign Application Priority Data
Aug. 9, 1972  Germany............................ 2239108

[52] U.S. Cl. ... 260/340.7; 260/327 TH; 260/327 M; 260/340.5; 260/340.9; 260/373; 260/380; 8/39; 8/40
[51] Int. Cl.² ............... C07D 319/06; C07D 317/28; C07D 317/72
[58] Field of Search .......... 260/340.7, 340.9, 327 M Primary Examiner—Norma S. Milestone
Attorney, Agent, or Firm—Plumley & Tyner

[57] ABSTRACT

Anthraquinone dyestuffs of the formula

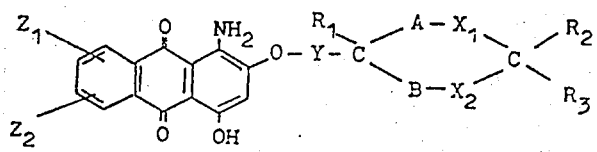

in which Y denotes a direct bond or an alkylene group which can be interrupted by hetero-atoms or sulphone groups, A denotes an alkylene group of the formula

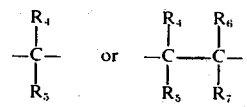

B denotes a direct bond or a group of the formula

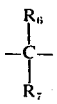

$R_1$–$R_7$ denotes hydrogen, alkyl or aryl, $X_1$ and $X_2$ denote oxygen or sulphur and $Z_1$ and $Z_2$ denote hydrogen or halogen and their use for the dyeing and printing of synthetic fibre materials. Dyeings obtained are distinguished by good build-up, high colour yield and excellent fastness properties, especially good fastness to light, sublimation and wet processing.

13 Claims, No Drawings

ANTHRAQUINONE DYESTUFFS

The present invention relates to new sparingly water-soluble anthraquinone dyestuffs which are free of sulphonic acid groups and carboxyl groups, of the formula

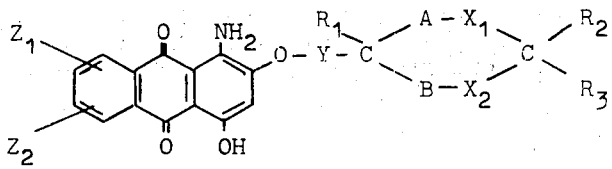

in which
Y denotes a direct bond or an alkylene group which can be interrupted by hetero-atoms or sulphone groups,
A denotes an alkylene group of the formula

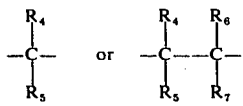

B denotes a direct bond or a group of the formula

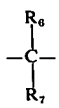

with the proviso that B represents a direct bond if A is a group of the formula

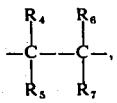

$R_1 - R_7$ denote hydrogen, alkyl or aryl, and additionally $R_2$ and $R_3$ can, conjointly with the carbon atom by which they are linked, and optionally with inclusion of hetero-atoms, form a five-membered to seven-membered non-aromatic ring,
$X_1$ and $X_2$ denote oxygen or sulphur and
$Z_1$ and $Z_2$ denote hydrogen or halogen and their manufacture and use for dyeing and printing synthetic fibre materials.

Suitable alkylene groups Y are groups with 1 – 6 C atoms which can be interrupted by hetero-atoms such as oxygen or sulphur atoms or by sulphone groups and are straight-chain or branched. As examples there may be mentioned: —CH$_2$—, —CH$_2$—CH$_2$—, —CH$_2$—CH(CH$_3$)—, —CH$_2$—C(CH$_3$)$_2$—, —(CH$_2$)$_3$—, —CH$_2$—CH(CH$_3$)—CH$_2$—, —CH$_2$—CH(CH$_3$)—, —CH$_2$—C(CH$_3$)$_2$—CH$_2$—, —CH$_2$—CH$_2$—C(CH$_3$)$_2$—, —CH$_2$—CH(CH$_3$)—CH(CH$_3$)—, —CH$_2$—C(CH$_3$)$_2$—CH(CH$_3$)—, —CH$_2$—CH(CH$_3$)—C(CH$_3$)$_2$—, —(CH$_2$)$_4$—, —CH$_2$—CH(CH$_3$)—CH$_2$—CH$_2$—, —CH$_2$—CH$_2$—CH(CH$_3$)—CH$_2$—, —CH$_2$—CH$_2$—CH$_2$—CH(CH$_3$)—, —CH$_2$—C(CH$_3$)$_2$—CH$_2$—CH$_2$—, —CH$_2$—CH$_2$—C(CH$_3$)$_2$—CH$_2$—, —CH$_2$—CH$_2$—CH$_2$—C(CH$_3$)$_2$—, —CH$_2$—CH(CH$_3$)—CH(CH$_3$)—CH$_2$—, —CH$_2$—CH$_2$—CH(CH$_3$)—CH(CH$_3$)—, —CH$_2$—CH(CH$_3$)—CH$_2$—CH(CH$_3$)—, —(CH$_2$)$_5$—, —CH$_2$—CH(CH$_3$)—CH$_2$—CH$_2$—CH$_2$—, —CH$_2$—CH$_2$—CH(CH$_3$)—CH$_2$—CH$_2$—, —CH$_2$—CH$_2$—CH$_2$—CH(CH$_3$)—CH$_2$—, —CH$_2$—CH$_2$—CH$_2$—CH$_2$—CH(CH$_3$)—, —(CH$_2$)$_6$—, —CH$_2$—CH$_2$—O—CH$_2$—, —CH$_2$—CH$_2$—O—CH$_2$—CH$_2$—, —CH$_2$—CH$_2$—O—CH$_2$—CH$_2$—CH$_2$—, —(CH$_2$)$_3$—O—CH$_2$—, —CH$_2$—O—(CH$_2$)$_4$—, —(CH$_2$)$_3$—O—CH$_2$—, —CH$_2$—CH$_2$—O—CH$_2$—CH$_2$—CH$_2$—, —(CH$_2$)$_3$—O—CH$_2$—CH$_2$—, —(CH$_2$)$_3$—O—(CH$_2$)$_3$—, —(CH$_2$)$_3$—O—(CH$_2$)$_4$—, —CH$_2$—CH(CH$_3$)—O—CH$_2$—, —CH$_2$—CH(CH$_3$)—O—(CH$_2$)$_4$—, —(CH$_2$)$_4$—O—CH$_2$—, —(CH$_2$)$_4$—O—CH$_2$—CH$_2$—, —(CH$_2$)$_4$—O—(CH$_2$)$_4$—, —CH$_2$—CH(CH$_2$—CH$_3$)—O—CH$_2$—, —CH$_2$—C(CH$_3$)$_2$—O—CH$_2$—, —CH$_2$—CH$_2$—S—CH$_2$—, —CH$_2$—CH$_2$—S—CH$_2$—CH$_2$—, —CH$_2$—CH$_2$—S—(CH$_2$)$_3$—, —CH$_2$—CH$_2$—S—(CH$_2$)$_4$—, —(CH$_2$)$_3$—S—CH$_2$—, —(CH$_2$)$_3$—S—(CH$_2$)$_4$—, —CH$_2$—CH(CH$_3$)—S—CH$_2$—, —CH$_2$—CH(CH$_3$)—S—(CH$_2$)$_4$—, —(CH$_2$)$_4$—S—CH$_2$—, —(CH$_2$)$_4$—S—CH$_2$—CH$_2$—, —(CH$_2$)$_4$—S—(CH$_2$)$_4$—, —CH$_2$—C(CH$_3$)$_2$—S—CH$_2$—, —CH$_2$—CH$_2$—SO$_2$—CH$_2$—, —CH$_2$—CH$_2$—SO$_2$—CH$_2$—CH$_2$—, —CH$_2$—CH$_2$—SO$_2$—(CH$_2$)$_4$—, —(CH$_2$)$_3$—SO$_2$—CH$_2$—, —CH$_2$—CH(CH$_3$)—SO$_2$—CH$_2$—,
—(CH$_2$)$_4$—SO$_2$—CH$_2$—
—CH$_2$—CH$_2$—O—CH$_2$—CH$_2$—O—CH$_2$—,
—CH$_2$—CH$_2$—O—CH$_2$—CH$_2$—O—CH$_2$—CH$_2$—,
—CH$_2$—CH$_2$—O—CH$_2$—CH$_2$—O—(CH$_2$)$_4$—, —CH$_2$—CH$_2$—O—CH$_2$—CH$_2$—S—CH$_2$—,
—CH$_2$—CH$_2$—O—CH$_2$—CH$_2$—S—(CH$_2$)$_3$—, —CH$_2$—CH$_2$—O—CH$_2$—CH$_2$—S—(CH$_2$)$_4$—, —CH$_2$—CH$_2$—S—CH$_2$—CH$_2$—O—CH$_2$—, —CH$_2$—CH$_2$—S—CH$_2$—CH$_2$—O—CH$_2$—CH$_2$—, —CH$_2$—CH$_2$—S—CH$_2$—CH$_2$—O—(CH$_2$)$_4$—, —CH$_2$—CH$_2$—S—CH$_2$—CH$_2$—S—CH$_2$—, —CH$_2$—CH$_2$—S—CH$_2$—CH$_2$—S—(CH$_2$)$_4$—, —CH$_2$—CH$_2$—O—CH$_2$—CH$_2$—SO$_2$—CH$_2$—, —CH$_2$—CH$_2$—SO$_2$—CH$_2$—CH$_2$—O—CH$_2$—, —CH$_2$—CH$_2$—S—CH$_2$—CH$_2$—SO$_2$—CH$_2$—, —CH$_2$—CH$_2$—SO$_2$—CH$_2$—CH$_2$—S—CH$_2$—, —CH$_2$—CH$_2$—SO$_2$—CH$_2$—CH$_2$—SO$_2$—CH$_2$—.

Suitable alkyl radicals $R_1$, $R_4$, $R_5$, $R_6$ and $R_7$ are those with 1 – 5 C atoms which can be substituted by halogen atoms, hydroxyl groups, alkoxy groups with 1 – 4 C atoms, or phenoxy, phenyl-C$_1$-C$_2$-alkoxy or phenyl radicals which are optionally substituted by halogen, alkyl groups with 1 – 4 carbon atoms or alkoxy groups with 1 – 4 C atoms, such as, for example: —CH$_3$, —CH$_2$—CH$_3$, —CH$_2$—CH$_2$—CH$_3$, —CH(CH$_3$)$_2$, —CH$_2$—CH$_2$—CH$_2$—CH$_3$, —CH$_2$—CH(CH$_3$)$_2$, —CH(CH$_3$)—CH$_2$—CH$_3$, —C(CH$_3$)$_3$, —(CH$_2$)$_4$—CH$_3$, —CH(CH$_3$)—CH$_2$—CH$_2$—CH$_3$, —CH$_2$—CH(CH$_3$)—CH$_2$—CH$_3$, —CH$_2$—CH$_2$—CH(CH$_3$)$_2$, —CH(CH$_2$—CH$_3$)$_2$, —C(CH$_3$)$_2$—CH$_2$—CH$_3$, —CH$_2$—C(CH$_3$)$_3$, —CH$_2$—Cl, —CH$_2$—CH$_2$—Br, —CH$_2$—CH$_2$—F, —CH$_2$—OH, —CH$_2$—CH$_2$—OH, —CH(OH)—CH$_3$, —CH$_2$—CH$_2$—CH$_2$—OH, —CH$_2$—CH(OH)—CH$_3$, —(CH$_2$)$_4$—OH, —(CH$_2$)$_5$—OH, —CH(OH)—CH$_2$—OH, —CH$_2$—CH(OH)—CH$_2$—OH, —CH$_2$—O—CH$_3$, —CH$_2$—O—CH$_2$—CH$_3$, —CH$_2$—O—CH$_2$—CH$_2$—CH$_3$, —CH$_2$—O—CH(CH$_3$)$_2$, —CH$_2$—O—(CH$_2$)$_4$—CH$_3$, —CH$_2$—O—CH$_2$—CH(CH$_3$)$_2$, —CH$_2$—O—CH(CH$_3$)—CH —CH$_2$—CH$_3$, —CH$_2$—O—C(CH$_3$)$_3$, —CH$_2$—CH$_2$—O—CH$_3$, —CH$_2$—CH$_2$—O—CH$_2$—CH$_3$, —CH$_2$—CH$_2$—O—(CH$_2$)$_3$—CH$_3$, —CH(OCH$_3$)—CH$_3$, —(CH$_2$)$_3$—O—CH$_3$, —(CH$_2$)$_3$—O—CH$_2$—CH$_3$, —CH$_2$—CH(OCH$_3$)—CH$_3$, —(CH$_2$)$_4$—O—CH$_3$, —(CH$_2$)$_4$—O—CH(CH$_3$)$_2$, —CH(OCH$_3$)—CH$_2$—OCH$_3$, —CH$_2$—O—CH$_2$—CH$_2$—O—CH$_3$, —CH$_2$—O—CH$_2$—CH$_2$—O—CH$_2$—CH$_3$, —CH$_2$—CH$_2$—O—CH$_2$—CH$_2$—O—CH$_3$,

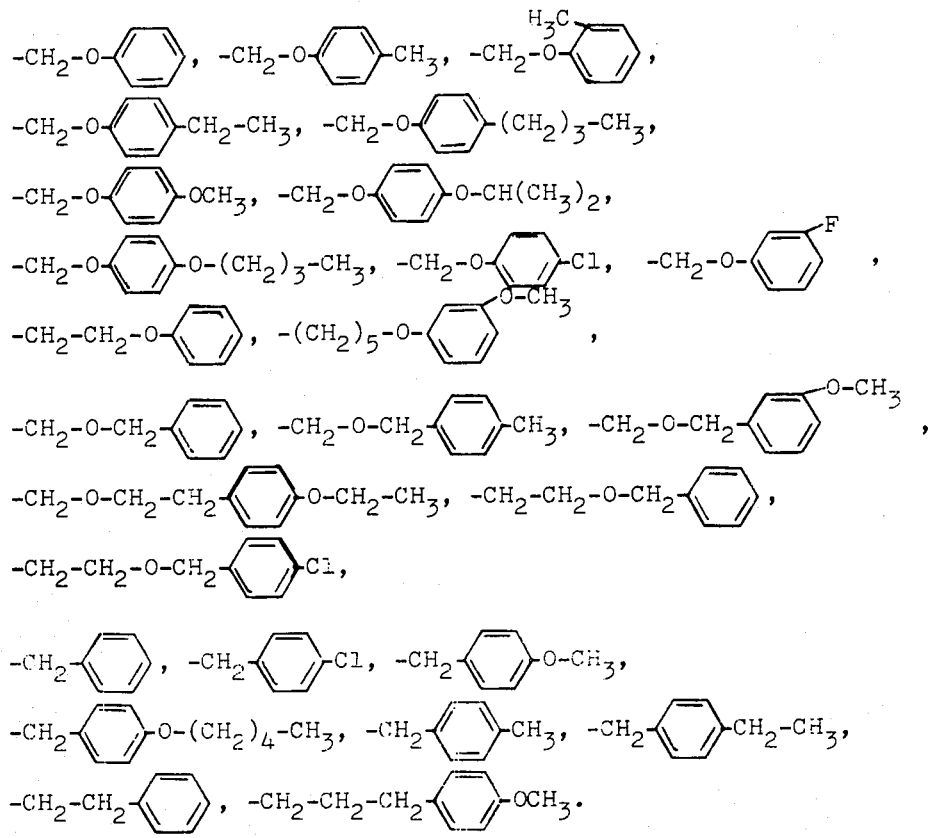

Suitable aryl radicals R$_1$ to R$_7$ are phenyl radicals which are optionally substituted by halogen atoms, alkyl groups with 1 – 4 C atoms or alkoxy groups with 1 – 4 carbon atoms, such as, for example:

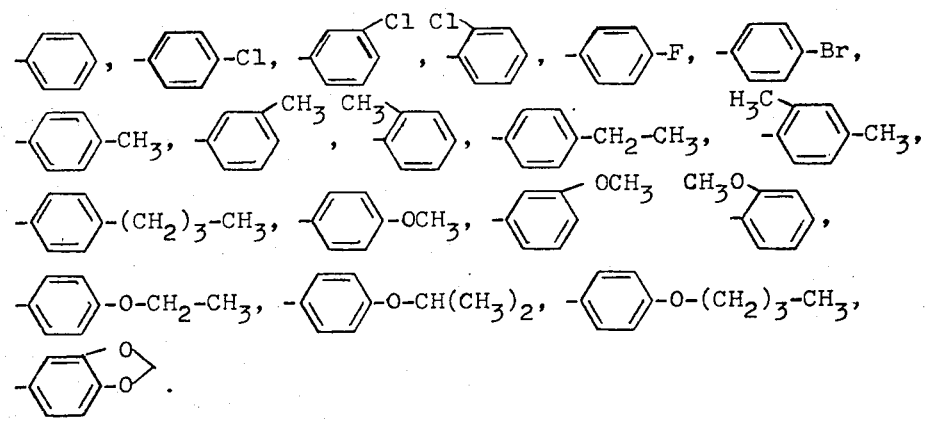

Suitable alkyl radicals R$_2$ and R$_3$ are those with 1 – 5 C atoms which can be substituted by C$_1$–C$_4$-alkoxy, C$_1$–C$_4$-alkylmercapto, halogen (such as F, Cl and Br), C$_2$–C$_5$-alkyl-carbonyl, C$_2$–C$_5$-alkoxycarbonyl, phenyl-carbonyl and by phenyl, phenoxy or benzyloxy radicals which are optionally substituted by C$_1$–C$_4$-alkyl, C$_1$–C$_4$-alkoxy or halogen (Cl, F and Br); as examples there may be mentioned: —CH$_3$, —CH$_2$—CH$_3$, —CH$_2$—CH$_2$—CH$_3$, —CH(CH$_3$)$_2$, —CH$_2$—CH$_2$—CH$_2$—CH$_3$, —CH$_2$—CH(CH$_3$)$_2$, —CH(CH$_3$)—CH$_2$—CH$_3$, —C(CH$_3$)$_3$, —CH$_2$—CH$_2$—CH$_2$—CH$_2$—CH$_3$, —CH(CH$_3$)—CH$_2$—CH$_2$—CH$_3$, —CH$_2$—CH(CH$_3$)—CH$_2$—CH$_3$, —CH$_2$—CH$_2$—CH(CH$_3$)$_2$, —CH(CH$_2$—CH$_3$)$_2$, —C(CH$_3$)$_2$—CH$_2$—CH$_3$, —CH$_2$—C(CH$_3$)$_3$, —CH$_2$—OCH$_3$, —CH$_2$—O—CH$_2$—CH$_3$, —CH$_2$—O—CH$_2$—CH$_2$—CH$_3$, —CH$_2$—CH$_2$—O—CH$_3$, —CH$_2$—CH$_2$—CH$_2$—O—CH$_3$, —CH$_2$—O—CH$_2$—CH$_2$—O—CH$_3$; —CH$_2$—CH$_2$—S—CH$_3$, —CH$_2$—Cl, —CH$_2$—CH$_2$—Br, —CH$_2$—CH$_2$—F.

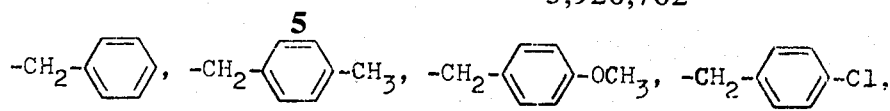

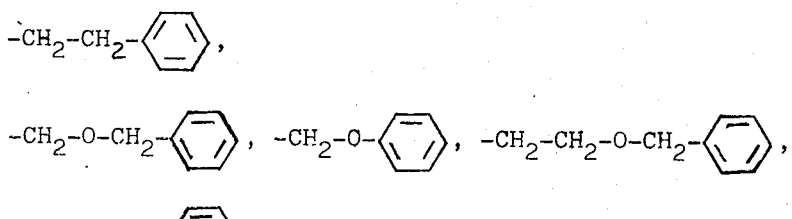

—CH$_2$—CO—CH$_3$, —CH$_2$—CH$_2$—CO—CH$_3$, —CH$_2$—CO—CH$_2$—CH$_3$,

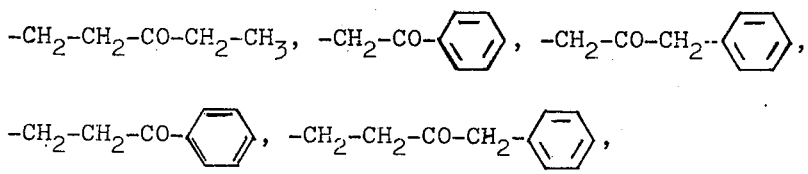

—CH$_2$—CO—OCH$_3$, —CH$_2$—CO—O—CH$_2$—CH$_3$, —CH$_2$—CH$_2$—CO—O—CH$_3$, —CH$_2$—CH$_2$—CO—OCH$_3$.

Suitable non-aromatic rings which R$_2$ and R$_3$ can form together with the linking C-atom are, for example:

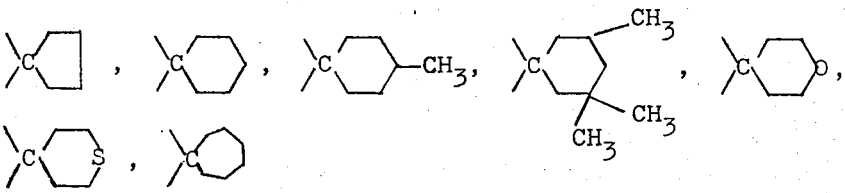

Suitable halogen atoms Z$_1$ and Z$_2$ are F, Cl and Br, but preferably Cl.

The radicals X$_1$ and X$_2$ in particular represent oxygen.

Preferred dyestuffs of the formula I are those of the formula

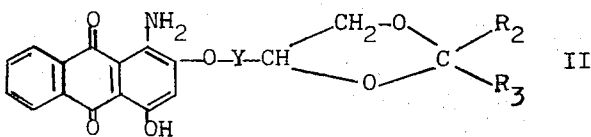     II as well as those of the formula

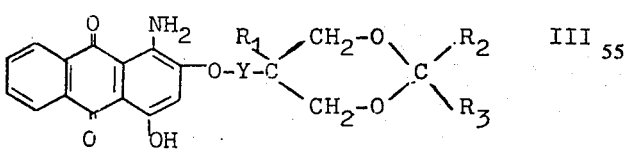     III wherein Y, R$_1$, R$_2$ and R$_3$ have the abovementioned meaning.

Very particularly preferred dyestuffs are those of the formula II, wherein

Y denotes C$_1$–C$_4$-alkylene and

R$_2$ and R$_3$ denote hydrogen or C$_1$–C$_4$-alkyl, and those of the formula III, wherein Y denotes C$_1$–C$_4$-alkylene, R$_1$ denotes hydrogen, methyl or ethyl and R$_2$ and R$_3$ denote hydrogen or C$_1$–C$_4$-alkyl.

The new anthraquinone dyestuffs of the formula I can be manufactured according to various processes.

One process is characterised in that compounds of the formula

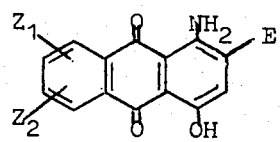     IV wherein

Z$_1$ and Z$_2$ have the abovementioned meaning and

E represents a substituent which can be replaced, are reacted with compounds of the formula

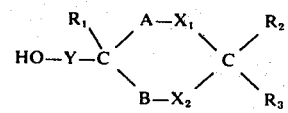     V wherein

A, B, R$_1$, R$_2$, R$_3$, Y, X$_1$ and X$_2$ have the abovementioned meaning in the presence of basic compounds and optionally in the presence of an organic solvent, at elevated temperatures.

In principle, the reaction of IV with V can be carried out without the aid of solvents. However, it is advantageously carried out in the presence of an organic solvent which is inert under the reaction conditions, and the reactant V is employed in at least equivalent amount.

In some cases it is also advisable to carry out the reaction in an excess of V, which then simultaneously serves as the solvent.

Suitable organic solvents are: dimethylformamide, dimethylacetamide, dimethylsulphoxide, pyrrolidone-2, N-methylpyrrolidone-2, ξ-caprolactam and pyridine.

The reaction temperatures can be varied over a substantial range. In general, the reaction is carried out at 80° – 180°C, preferably at 120°– 160°C.

Suitable alkaline compounds are inorganic bases such as, for example, oxides or hydroxides of alkali metals or alkaline earth metals, such as sodium hydroxide, potassium hydroxide or calcium oxide, alkali metal salts of weak acids, such as sodium carbonate, potassisum carbonate, sodium acetate or potassium acetate, or organic bases such as, for example, trimethylamine, triethylamine or benzyltrimethylammonium hydroxide.

Possible replaceable substituents E are in particular: halogen, such as chlorine and bromine, lower alkoxy groups, especially the methoxy group, optionally substituted aryloxy groups, preferably phenoxy groups, or sulphonic acid groups.

Examples of suitable anthraquinone compounds IV are: 1-amino-4-hydroxy-2-phenoxy-anthraquinone, 1-amino-4-hydroxy-2-(4-chloro-phenoxy)-anthraquinone, 1-amino-4-hydroxy-2-methoxy-anthraquinone, 1-amino-4-hydroxy-2-bromo-anthraquinone, 1-amino-4-hydroxy-2-chloro-anthraquinone, 1-amino-4-hydroxyanthraquinone-2-sulphonic acid, and 6-chloro-, 7-chloro-, 6,7-dichloro-, 6-fluoro-, 7-fluoro- and 6,7-difluoro-1-amino-4-hydroxy-2-phenoxy-anthraquinone.

The compounds of the formula V are in part known or can easily be prepared according to known processes (compare, for example "Methoden der organischen Chemie" ("Methods of Organic Chemistry") by Houben-Weyl, volume VI/3, page 213 et seq., 246 et seq. and 265 et seq. and volume VII/1, page 417 et seq.).

Suitable compounds of the formula V are: 2-methyl-2-ethyl-5-(2-hydroxy-ethyl)-dioxolane-(1,3), 2,2-di-methyl-5-(2-hydroxy-ethyl)-dioxolane-(1,3), 2-phenyl-2-methyl-5-(2-hydroxy-ethyl)-dioxolane-(1,3), 2-methyl-5-(2-hydroxy-ethyl)-dioxolane-(1,3), 5-(2-hydroxy-ethyl)-dioxolane-(1,3), 2-phenyl-5-(2-hydroxy-ethyl)-dioxolane-(1,3), 2-benzyl-5-(2-hydroxy-ethyl)-dioxolane-(1,3), 2-[propyl-(2)]-5-(2-hydroxyethyl)-dioxolane-(1,3), 2-propyl-5-(2-hydroxy-ethyl)-dioxolane-(1,3), 2-ethyl-5-(2-hydroxy-ethyl)-dioxolane-(1,3), 2,2-di-methyl-5-ethyl-5-(2-hydroxy-ethyl)-dioxolane-(1,3), 2-ethyl-5-methyl-5-(2-hydroxy-ethyl)-dioxolane-(1,3), 2-phenyl-2-ethyl-5-hydroxymethyl-dioxolane-(1,3), 2-benzyl-2-ethyl-5-hydroxymethyl-dioxolane-(1,3), 2,2-di-ethyl-5-hydroxymethyldioxolane-(1,3), 2,2-di-methyl-5-hydroxymethyl-dioxolane-(1,3), 2-phenyl-2-methyl-5-hydroxymethyl-dioxolane-(1,3), 2-benzyl-2-methyl-5-hydroxymethyl-dioxolane-(1,3), 2-(2-methyl-propyl)-2-methyl-5-hydroxymethyl-dioxolane-(1,3), 2-[propyl-(2)]-2-methyl-5-hydroxymethyl-dioxolane-(1,3), 2-propyl-2-methyl-5-hydroxymethyl-dioxolane-(1,3), 2-ethyl-2-methyl-5-hydroxymethyl-dioxolane-(1,3), 2-methyl-5-hydroxymethyl-dioxolane(1,3), 5-hydroxymethyl-dioxolane-(1,3), 2-(cyclohex-3-enyl)-5-hydroxymethyl-dioxolane-(1,3), 2-cyclohexyl-5-hydroxymethyldioxolane-(1,3), 2-(3,4-methylene-dioxy-phenyl)-5-hydroxymethyl-dioxolane-(1,3), 2-(2-chloro-phenyl)-5-hydroxymethyldioxolane-(1,3), 2-(4-methoxy-phenyl)-5-hydroxymethyldioxolane-(1,3), 2-(2-methoxy-phenyl)-5-hydroxymethyldioxolane-(1,3), 2-(4-ethyl-phenyl)-5-hydroxymethyl-dioxolane-(1,3), 2-(2,4-dimethyl-phenyl)-5-hydroxymethyl-dioxolane-(1,3), 2-(4-methyl-phenyl)-5-hydroxymethyl-dioxolane-(1,3), 2-phenyl-5-hydroxymethyl-dioxolane-(1,3), 2-(3-chloro-benzyl)-5-hydroxymethyl-dioxolane-(1,3), 2-(4-methoxy-benzyl)-5-hydroxymethyl-dioxolane-(1,3), 2-(4-methyl-benzyl)-5-hydroxymethyl-dioxolane-(1,3), 2-benzyl-5-hydroxymethyl-dioxolane-(1,3), 2-(2,2-dimethyl-propyl)-5-hydroxymethyl-dioxolane-(1,3), 2-[methylbutyl-(2)]-5-hydroxymethyl-dioxolane-(1,3), 2-[pentyl-(3)]-5-hydroxymethyl-dioxolane-(1,3), 2-(3-methyl-butyl)-5-hydroxymethyl-dioxolane-(1,3), 2-(2-methyl-butyl)-5-hydroxymethyldioxolane-(1,3), 2-[pentyl-(2)]-5-hydroxymethyl-dioxolane-(1,3), 2-pentyl-5-hydroxymethyl-dioxolane-(1,3), 2-[2-methylpropyl-(2)]-5-hydroxymethyl-dioxolane-(1,3), 2-(2-methylpropyl)-5-hydroxymethyl-dioxolane-(1,3), 2-[butyl-(2)]-5-hydroxymethyl-dioxolane-(1,3), 2-butyl-5-hydroxymethyl-dioxolane-(1,3), 2-[propyl-(2)]-5-hydroxymethyl-dioxolane-(1,3), 2-propyl-5-hydroxymethyl-dioxolane-(1,3), 2-ethyl-5-hydroxymethyl-dioxolane-(1,3), 2,2-di-methyl-5-ethyl-5-hydroxymethyl-dioxolane-(1,3), 5-methyl-5-hydroxymethyl-dioxolane-(1,3), 2-methyl-2-ethyl-5-(4-hydroxy-butyl)-dioxolane-(1,3), 2,2-dimethyl-5-(4-hydroxy-butyl)-dioxolane-(1,3), 2-phenyl-2-methyl-5-(4-hydroxy-butyl)-dioxolane-(1,3), 2-benzyl-2-methyl-5-(4-hydroxy-butyl)-dioxolane-(1,3), 2-[propyl-(2)]-2-methyl-5-(4-hydroxy-butyl)-dioxolane-(1,3), 2-propyl-2-methyl-5-(4-hydroxy-butyl)-dioxolane-(1,3), 5-(4-hydroxy-butyl)-dioxolane-(1,3), 2-phenyl-5-(4-hydroxy-butyl)-dioxolane-(1,3), 2-benzyl-5-(4-hydroxy-butyl)-dioxolane-(1,3), 2-[propyl-(2)]-5-(4-hydroxy-butyl)-dioxolane-(1,3), 2-propyl-5-(4-hydroxy-butyl)-dioxolane-(1,3), 2-ethyl-5-(4-hydroxy-butyl)-dioxolane-(1,3), 2,2-di-methyl-5-ethyl-5-(4-hydroxy-butyl)-dioxolane-(1,3), 5-methyl-5-(4-hydroxy-butyl)-dioxolane-(1,3), 2-(2-methylpropyl)-2-propyl-5-hydroxymethyl-dioxolane-(1,3), 2,2-dipropyl-5-hydroxymethyl-dioxolane-(1,3), 2,2-di-methoxycarbonylmethyl-5-hydroxymethyl-dioxolane-(1,3), 2-pentyl-2-benzyl-5-hydroxymethyl-dioxolane-(1,3), 2-pentyl-2-(2-methyl-butyl)-5-hydroxymethyl-dioxolane-(1,3), 2-propoxymethyl-2-methyl-5-hydroxymethyl-dioxolane-(1,3), 2-methoxymethyl-2-methyl-5-hydroxymethyl-dioxolane-(1,3), 2-phenacyl-2-methyl-5-hydroxymethyl-dioxolane-(1,3), 2-(butan-3-onyl)-2-methyl-5-hydroxymethyl-dioxolane-(1,3), 2-acetonyl-2-methyl-5-hydroxymethyldioxolane-(1,3), 2-phenoxymethyl-2-methyl-5-hydroxymethyl-dioxolane-(1,3), 2-benzyloxyethyl-2-methyl-5-hydroxymethyl-dioxolane-(1,3), 2-benzyloxymethyl-2-methyl-5-hydroxymethyl-dioxolane-(1,3), 2-chloromethyl-2-methyl-5-hydroxymethyldioxolane-(1,3), 2-(2-methyl-mercapto-ethyl)-2-methyl-5-hydroxymethyl-dioxolane-(1,3), 2-[(2-methoxy-ethoxy)-methyl]-2-methyl-5-hydroxymethyl-dioxolane-(1,3), 2-(2-methoxy-propyl) 2-methyl-5-hydroxymethyl-dioxolane-(1,3), 2-(2-methoxy-ethyl)-2-methyl-5-hydroxymethyl-dioxolane-(1,3), 2-methoxycarbonylpropyl-2-methyl-5-hydroxymethyl-dioxolane-(1,3), 2-methoxycarbonylethyl-2-methyl-5-hydroxymethyl-dioxolane-(1,3), 2-ethoxycarbonylmethyl-2-methyl-5-hydroxymethyl-dioxolane-(1,3), 2-methoxycarbonylmethyl-2-methyl-5-hydroxymethyl-dioxolane-(1,3), 2-(3-phenyl-acetonyl)-2-methyl-5-hydroxymethyl-dioxolane-(1,3), 2-methoxymethyl-2-phenyl-5-hydroxymethyl-dioxolane-(1,3), 2-pentyl-2-phenyl-5-hydroxymethyl-dioxolane-(1,3), 2-propyl-2-phenyl-5-hydroxymethyl-dioxolane-(1,3), 2-methoxycarbonylmethyl-2-phenyl-5-hydroxymethyl-dioxolane-(1,3), 2-acetonyl-2-phenyl-5-hydroxymethyl-dioxolane-(1,3), 2-(2-methylmercapto-ethyl)-2-phenyl-5-hydroxymethyl-dioxolane-(1,3), 2,2-di-methyl-4-butyl-5-hydroxymethyl-dioxolane-(1,3), 2-phenyl-4-methyl-5-hydroxymethyl-dioxolane-(1,3), 2,4-di-phenyl-2-methyl-5-hydroxymethyl-dioxolane-(1,3), 2-methyl-4-benzyl-5-hydroxymethyl-dioxolane-(1,3), 2,2-di-methyl-4-methylmercaptomethyl-5-hydroxymethyl-dioxolane-(1,3), 2-phenyl-2-methyl-4-(3-methoxy-propyl)-5-hydroxymethyl-dioxolane-(1,3), 2-methyl-2-ethyl-4-phenoxymethyl-5-hydroxymethyl-dioxolane-(1,3), 2-phenyl-4-benzyloxymethyl-5-hydroxymethyl-dioxolane-(1,3), 2-phenyl-2-methyl-4-methoxymethyl-5-hydroxymethyl-dioxolane-(1,3), 4-(4-hydroxy-butyl)-5-hydroxymethyl-dioxolane-(1,3), 4-hydroxymethyl-5-hydroxymethyl-dioxolane-(1,3), 2-ethyl-4-(2-methyl-butyl)-5-hydroxymethyl-dioxolane-(1,3), 5-[propyl-(2)]-5-hydroxymethyl-dioxolane-(1,3), 5-(3-methoxy-propyl)-5-hydroxymethyl-dioxolane-(1,3), 2-ethyl-2-methyl-5-phenoxymethyl-5-hydroxymethyl-dioxolane-(1,3), 5-benzyloxymethyl-5-hydroxymethyl-dioxolane-(1,3), 2-phenyl-5-ethoxymethyl-5-hydroxymethyl-dioxolane-(1,3), 2-phenyl-5-(5-hydroxy-pentyl)5-hydroxymethyl-dioxolane-(1,3), 2,2-di-methyl-5-hydroxymethyl-5-hydroxymethyl-dioxolane-(1,3), 5-pentyl-5-hydroxymethyl-dioxolane-(1,3), 2-methyl-2-ethyl-5-butyl-5-hydroxymethyl-dioxolane-(1,3), 5-(3-methoxy-phenyl)-5-hydroxymethyl-dioxolane-(1,3), 5-phenyl-5-hydroxymethyl-dioxolane-(1,3), 2-phenyl-2-methyl-5-benzyl-5-hydroxymethyl-dioxolane-(1,3), 5-methylmercaptomethyl-5-hydroxymethyl-dioxolane-(1,3), 5-(5-hydroxy-pentyl)-dioxolane-(1,3), 2,2-di-methyl-5-(3-hydroxy-propyl)-dioxolane-(1,3), 2,2-di-methyl-5-[(2-hydroxy-ethyl-mercapto)-methyl]-dioxolane-(1,3), 5-[4-(4-hydroxy-butoxy)-butyl]-dioxolane-(1,3), 2-phenyl-5-[(1-hydroxy-prop-2-oxy)-methyl]-dioxolane-(1,3), 5-[(3-hydroxy-propoxy)-methyl]-dioxolane-(1,3), 5-[4-(2-hydroxy-ethoxy)-butyl]-dioxolane-(1,3), 2-phenyl-2-methyl-5-[2-(2-hydroxy-ethoxy)-ethyl]-dioxolane-(1,3), 2-ethyl-2-methyl-5-[(2-hydroxy-ethoxy)-methyl]-dioxolane-(1,3), 2-phenyl-5-(4-hydroxy-2-methyl-butyl)-dioxolane-(1,3), 5-(3-hydroxy-2,2-dimethyl-propyl)-dioxolane-(1,3), 2-phenyl-5-(3-hydroxy-2-methyl-propyl)-dioxolane-(1,3), 2-methyl-2-ethyl-5-[1-hydroxy-propyl-(2)]-dioxolane-(1,3), 2,2-di-methyl-5-(6-hydroxy-hexyl)-dioxolane-(1,3), 5-[2-(2-(2-hydroxy-ethoxy)-ethoxy)-ethyl]-dioxolane-(1,3), 2,2-di-methyl-5-[4-(2-hydroxy-ethyl-sulphonyl)-butyl]-dioxolane-(1,3), 2-phenyl-5-[(2-hydroxy-ethyl-sulphonyl)-methyl]-dioxolane-(1,3), 2-phenyl-2-methyl-5-[4-(2-hydroxy-ethyl-mercapto)-butyl]-dioxolane-(1,3), 2,2,-di-methyl-4-(4-hydroxy-butyl)-dithiolane-(1,3), 2-phenyl-2-methyl-4-(2-hydroxy-ethyl)-dithiolane-(1,3), 2-ethyl-2-methyl-4-hydroxymethyl-dithiolane-(1,3), 4-(4-hydroxy-butyl)-oxathiol-(1,3), 2,2-di-ethyl-4-(2-hydroxy-ethyl)-oxathiol-(1,3), 4-hydroxymethyl-oxathiol-(1,3), 2,2-di-methyl-5-(4-hydroxy-butyl)-oxathiol-(1,3), 2-ethyl-2-methyl-5-(2-hydroxy-ethyl)-oxathiol-(1,3), 5-hydroxymethyl-oxathiol-(1,3), 2-(2-hydroxy-ethyl)-8-methyl-1,4-dioxaspiro[4,4]nonane, 2-(4-hydroxy-butyl)-1,4-dioxaspiro[4,4]nonane, 2-hydroxymethyl-1,4-dioxaspiro[4,4]nonane, 2-2-hydroxy-ethyl)-1,4-dioxa-8-thiaspiro[4,5]decane, 2-(4-hydroxy-butyl)-1,4,8-trioxaspiro[4,5]decane, 2-hydroxymethyl-1,4,8-trioxaspiro[4,5]decane, 2-(4-hydroxy-butyl)-7,7,9-trimethyl-1,4-dioxaspiro[4,5]decane, 2-(2-hydroxy-ethyl)-8-methyl-1,4-dioxaspiro[4,5]decane, 2-hydroxymethyl-1,4-dioxaspiro[4,5]decane, 2-ethyl-4,4-dimethyl-5-hydroxymethyl-dioxolane-(1,3), 2-methyl-2,5-di-ethyl-5-(2-hydroxy-ethyl)-dioxane-(1,3), 2-[propyl-(2)]-5-ethyl-5-(2-hydroxy-ethyl)-dioxane-(1,3), 2,2,5-tri-methyl-5-(2-hydroxy-ethyl)-dioxane-(1,3), 2-[propyl-(2)]-2-ethyl-5-hydroxymethyl-dioxane-(1,3), 2,2-di-ethyl-5-hydroxymethyl-dioxane-(1,3), 5-hydroxymethyl-dioxane-(1,3), 2-butyl-2,5-di-ethyl-5-hydroxymethyl-dioxane-(1,3), 2,2-di-methyl-5-ethyl-5-hydroxymethyl-dioxane-(1,3), 5-ethyl-5-hydroxymethyl-dioxane-(1,3), 2-(cyclohex-3-enyl)-5-ethyl-5-hydroxymethyl-dioxane-(1,3), 2-phenyl-5-ethyl-5-hydroxymethyl-dioxane-(1,3), 2-propyl-5-ethyl-5-hydroxymethyl-dioxane-(1,3), 2-phenyl-2-ethyl-5-methyl-5-hydroxymethyl-dioxane-(1,3), 2-benzyl-2-ethyl-5-methyl-5-hydroxymethyl-dioxane-(1,3), 2,2,5-tri-methyl-5-hydroxymethyl-dioxane-(1,3), 5-methyl-5-hydroxymethyl-dioxane-(1,3), 2-phenyl-5-methyl-5-hydroxymethyl-dioxane-(1,3), 2-[propyl-(2)]-5-methyl-5-hydroxymethyl-dioxane-(1,3), 5-ethyl-5-(4-hydroxy-butyl)-dioxane-(1,3), 2,5-di-ethyl-5-(4-hydroxy-butyl)-dioxane-(1,3), 5-methyl-5-(4-hydroxy-butyl)-dioxane-(1,3), 2-phenyl-5-methyl-5-(4-hydroxy-butyl)-dioxane-(1,3), 2,2-di-propyl-5-ethyl-5-hydroxymethyl-dioxane-(1,3), 2-methoxymethyl-2-methyl-5-methyl-5-hydroxymethyl-dioxane-(1,3), 2-acetonyl-2-methyl-5-methyl-5-hydroxymethyl-dioxane-(1,3), 2-phenacyl-2-methyl-5-ethyl-5-hydroxymethyl-dioxane-(1,3), 2-methoxycarbonylmethyl-2-methyl-5-ethyl-5-hydroxymethyl-dioxane-(1,3), 2-ethoxycarbonylmethyl-2-phenyl-5-ethyl-5-hydroxymethyl-dioxane-(1,3), 2-acetonyl-2-phenyl-5-ethyl-5-hydroxymethyl-dioxane-(1,3), 2-propyl-2-phenyl-5-methyl-5-hydroxymethyl-dioxane-(1,3), 2-benzyloxymethyl-2-phenyl-5-methyl-5-hydroxymethyl-dioxane-(1,3), 4,5-di-methyl-5-hydroxymethyl-dioxane-(1,3), 2,2,5-tri-methyl-4-hydroxymethyl-5-hydroxymethyl-dioxane-(1,3), 4-benzyl-5-ethyl-5-hydroxymethyl-dioxane-(1,3), 2-phenyl-4-methoxymethyl-5-ethyl-5-hydroxymethyl-dioxane-(1,3), 2-phenyl-5-ethoxymethyl-5-hydroxymethyl-dioxane-(1,3), 2-ethyl-5-(5-hydroxy-pentyl)-5-hydroxymethyl-dioxane-(1,3), 5-hydroxymethyl-5-hydroxymethyl-dioxane-(1,3), 5-pentyl-5-hydroxymethyl-dioxane-(1,3), 5-methoxy-5-hydroxymethyl-dioxane-(1,3), 2,2-di-methyl-5-(3-methoxy-phenyl)-5-hydroxymethyl-dioxane-(1,3), 2-phenyl-2-methyl-5-benzyl-5-hydroxymethyl-dioxane-(1,3), 2-ethyl-5-methyl-5-(3-hydroxy-propyl)-dioxane-(1,3), 2-phenyl-2,5-di-methyl-5-[(2-hydroxy-ethyl-mercapto)-methyl]-dioxane-(1,3), 5-methyl-5-[4-(4-hydroxy-butoxy)-butyl]-dioxane-(1,3), 5-ethyl-5-[4-(2-hydroxy-ethoxy)-butyl]-dioxane-(1,3), 2,2,5-tri-methyl-5-[2-(2-hydroxy-ethoxy)-ethyl]-dioxane-(1,3), 2-phenyl-5-methyl-5-(3-hydroxy-2,2-dimethyl-propyl)-dioxane-(1,3), 5-ethyl-5-(6-hydroxy-hexyl)-dioxane-(1,3), 5-methyl-5-[(2-hydroxy-ethyl)-sulphonyl)-methyl]-dioxane-(1,3), 2phenyl-2-methyl-5-hydroxymethyl-oxathiane-(1,3), 2,2-di-methyl-5-(4-hydroxy-butyl)-5-ethyl-oxathiane-(1,3), 2,5-di-ethyl-2-methyl-5-(2-hydroxy-ethyl)-oxathiane-(1,3), 5-hydroxymethyl-5-ethyl-oxathiane-(1,3), 2,2,5-tri-methyl-5-(4-hydroxy-butyl)-oxathiane-(1,3), 5-(2-hydroxy-ethyl)-5-methyl-oxathiane-(1,3), 2,2,5-tri-methyl-5-hydroxymethyl-oxathiane-(1,3), 2,2-di-methyl-5-hydroxymethyl-dithiane-(1,3), 5-(4-hydroxy-butyl)-5-ethyl-dithiane-(1,3), 2-phenyl-2-methyl-5-hydroxymethyl-5-ethyl-dithinane-(1,3), 2-phenyl-5-hydroxymethyl-5-methyl-dithiane-(1,3), 8-hydroxymethyl-8-ethyl-6,10-dioxaspiro[4,5]decane, 8-hydroxymethyl-8-methyl- 6,10-dioxaspiro[4,5]decane, 3-hydroxy-methyl-3-ethyl-1,5-dioxa-9-thiaspiro[5,5]undecane, 3-hydroxymethyl-3-methyl-1,5-dioxa-9-thiaspiro[5,5]undecane, 3-hydroxymethyl-3-ethyl-1,5,9-trioxaspiro[5,5]undecane, 3-hydroxymethyl-3-methyl-1,5,9-trioxaspiro[5,5]undecane, 3-hydroxymethyl-3-ethyl-9-methyl-1,5-dioxaspiro[5,5]undecane, 3-hydroxymethyl-3-ethyl-1,5-dioxaspiro[5,5]undecane, 3-hydroxymethyl-3-methyl-1,5-dioxaspiro[5,5]undecane, 3-hydroxymethyl-3-methyl-8,8,10-trimethyl-1,5-dioxaspiro[5,5]undecane, 4,4-dimethyl-5-methyl-5-hydroxymethyl-dioxane-(1,3), 2,2,4,5-tetramethyl-4-ethyl-5-hydroxymethyl-dioxane-(1,3), and 2,2,4,4,5,6-hexamethyl-5-hydroxymethyl-dioxane-(1,3).

Mixtures of 1,3-dioxolanes and 1,3-dioxanes, such as are obtained, for example, by reaction of glycerine with aromatic aldehydes, are also suitable for use as starting materials for the synthesis of the dyestuffs of the formula I (compare, for example, Houben-Weyl, volume VI/3, page 216).

A further process for the manufacture of the new anthraquinone dyestuffs of the formula I is characterised in that compounds of the formula

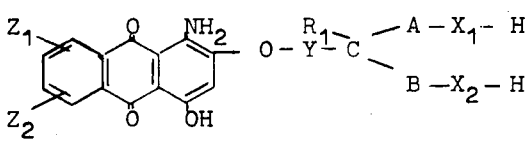 VI wherein
A, B, Y, $R_1$, $X_1$, $X_2$, $Z_1$ and $Z_2$ have the abovementioned meaning are reacted with carbonyl compounds

 VII wherein
$R_2$ and $R_3$ have the abovementioned meaning.

This reaction takes place in a manner which is in itself known, for example in accordance with the instructions in "Methoden der organischen Chemie" ("Methods of Organic Chemistry") by Houben-Weyl, volume VI/3, page 204 et seq. and volume VII/1, page 417 et seq. The anthraquinone compounds of the formula VI required as starting materials are in part known or obtainable according to methods which are in themselves known, for example by reaction of compounds of the formula IV with compounds of the formula

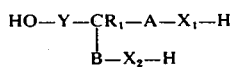

(compare, for example, British Patent Specification 1,270,736).

Suitable carbonyl compounds VII are acetaldehyde, propionaldehyde, butyraldehyde, benzaldehyde, acetophenone, acetone, diethyl ketone, methyl ethyl ketone, cyclopentanone, cylcohexanone, cycloheptanone and others.

The new compounds I are valuable dyestuffs for dyeing plastic compositions and synthetic materials and are in particular suitable, optionally also mixed with one another, for dyeing and/or printing fibres, filaments, woven fabrics, knitted fabrics, tapes, films or sheets of synthetic origin, but above all for dyeing and printing synthetic fibre materials. As synthetic fibre materials it is possible to use, in particular, linear aromatic polyesters, for example polyethylene terephthalates or polyesters from 1,4-bis-(hydroxymethyl)-cyclohexane and terephthalic acid, or fibre materials from synthetic high molecular polyamides, polyurethanes, polyacrylonitrile, polyolefines, cellulose triacetate or cellulose 2½-acetate.

Dyeing and printing can be carried out according to processes which are in themselves known. In dyeing and printing it is advantageous to bring the dyestuffs or the dystuff mixtures to a finely divided state prior to use, in accordance with the customary methods, for example by grinding or kneading, preferably in the presence of customary dispersing agents. When dyeing fibres of aromatic polyesters, for example polyethylene glycol terephthalate, the customary carriers can be added to the dyebath or the dyeing can be carried out without addition of carrier, at 120°–145°C under pressure. The dyestuffs are furthermore outstandingly suitable for dyeing by the thermosol process, in which the printed or padded fibre materials are briefly heated to temperatures of 180°–240°C, if appropriate after an intermediate drying. Heating is in general carried out for periods of 30 seconds to 2 minutes.

Cellulose triacetate, cellulose 2½-acetate and polyamide fibres can be dyed at about 100°C from aqueous liquors, if appropriate in the presence of the customary auxiliaries.

The dyestuffs are furthermore outstandingly suitable for dyeing mixed fabrics of polyester fibres and cellulose fibres, such as cotton, in accordance with the thermosol process mentioned, in which case the padding liquor contains, in addition to the dyestuffs which can be manufactured according to the invention, dyestuffs which are suitable for dyeing cotton, such as vat dyestuffs or especially dyestuffs which can form a covalent bond with the cellulose fibre (reactive dyestuffs). Such dyestuffs can contain, for example, a chlorotriazine radical or a chloroquinoxaline radical. In such a case it is necessary to add acid-binding agents, such as alkali metal carbonates or alkali metal phosphates, to the padding liquor. When using vat dyestuffs it is necessary to treat the thermosol-treated fabric with an aqueous alkaline solution of a reducing agent customary in vat dyeing.

The dyestuffs according to the invention and mixtures thereof are furthermore suitable for dyeing synthetic fibre materials from organic solvents, in accordance with methods which are in themselves known (compare, for example, British Patent Specifications 1,270,736 and 1,272,920).

Using the dyestuffs of the formula I according to the invention, the abovementioned processes yield, on the fibres listed, strong pink or red dyeings or prints which are distinguished by good build-up, high colour yield and excellent fastness properties, especially good fastness to light, sublimation and wet processing.

In the examples which follow, unless otherwise stated, the parts mentioned are parts by weight.

EXAMPLE 1

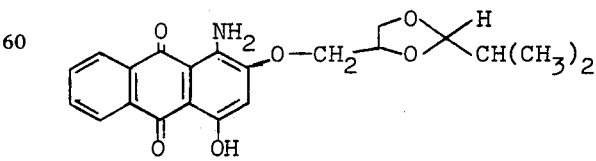

a. A mixture of 26.8 parts of 2-[propyl-(2)]-4-hydroxymethyl-dioxolane-(1,3), 22.6 parts of ε-caprolactam, 8.3 parts of 1-amino-4-hydroxy-2-phenoxy-anthraquinone and 2.6 parts of potassium carbonate is heated to 140°C for 3.5 hours. After this time, the thin layer chromatogram shows that no further starting material is present. The reaction mixture is diluted, at 70°C, with 40 parts of methanol and after cooling the crystals which have separated out are filtered off, washed with methanol and water and dried. 8.1 parts (84%) of yellowish-tinged red crystals are obtained.

b. 100 parts of polyethylene terephthalate fibres in 4,000 parts of water are dyed, in the presence of 15 parts of o-cresotic acid methyl ester as a carrier, with 1 part of the dyestuff mentioned in Example 1a), which has beforehand been brought to a finely divided state in the presence of dispersing agents, for 1.5 hours at 100°C and pH 4.5. A brilliant pink dyeing is obtained, which is distinguished by good build-up and high fastness to washing, thermofixing and rubbing.

c. 100 parts of polyester fibres (polyethylene terephthalate) in 3,000 parts of water are dyed for 1 hour at 125°–130°C, under pressure, with 1 part of this dyestuff which has beforehand been brought to a finely divided state by means of the usual auxiliaries. A clear, strong pink dyeing of good fastness properties is obtained.

EXAMPLE 2

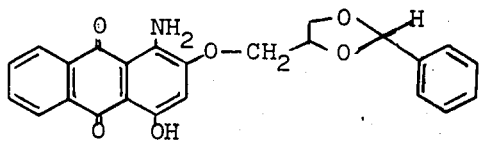

50 parts of 2-phenyl-4-hydroxymethyl-dioxalane-(1,3) and 2.6 parts of potassium carbonate are subjected to incipient distillation in vacuo to remove water. 8.3 parts of 1-amino-4-hydroxy-2-phenoxy-anthraquinone are added, the mixture is heated to 160°C until, after about 4 hours, the starting material has been completely converted, and the product is precipitated at 70°C by means of 40 parts of methanol, filtered off after cooling, washed with methanol and water and dried. 7.3 parts (71%) of light red crystals are obtained.

The dyestuff is also obtained in good yield if instead of potassium carbonate the following are used as condensation agents: sodium hydroxide or potassium hydroxide, sodium carbonate, sodium acetate or potassium acetate, calcium oxide or an organic base such as, for example, triethylamine, trimethylamine or benzyltrimethylammonium hydroxide.

The dyestuff dyes polyester fibres and polyamide fibres in brilliant pink shades.

EXAMPLE 3

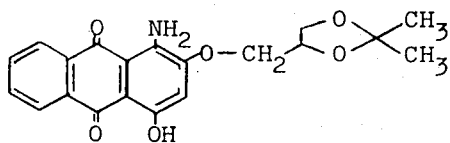

a. 50 parts of 2,2-dimethyl-4-hydroxymethyl-dioxolane-(1,3) and 2.1 parts of potassium hydroxide are subjected to incipient distillation in vacuo. 8.3 parts of 1-amino-4-hydroxy-2-phenoxy-anthraquinone are added, the mixture is heated to 160°C until after about 4 hours the starting material has been completely converted, the product is precipitated at 70°C by means of 56 parts of methanol and after working up as before, 8.5 parts (91%) of light red crystals with a metallic sheen are obtained.

b. If, in Example 3a, instead of 50 parts of 2,2-dimethyl-4-hydroxymethyl-dioxolane-(1,3) a mixture of 26.4 parts of this compound and 17 parts of pyrrolidone-(2) is used, the same dyestuff as before results, but the reaction is already complete after 1.5 hours.

This dyestuff yields a strong, clear pink dyeing of very good fastness properties on polyester fibres (polyethylene terephthalate) in accordance with the instructions in Example 1b.

c. A fabric of polyester fibres (polyethylene terephthalate) is impregnated on a padder with a liquor which contains, per liter, 20 g of dyestuff of the above structure which has beforehand been brough to a finely divided state in the presence of dispersing agents. The fabric is squeezed out to a weight increase of 70% and is dried in an air cushion drier or drying cabinet at 80°–120°C. Thereafter the fabric is treated for approx. 45 seconds with hot air at 190°–220°C in a stenter frame or jet-type hotflue and is then rinsed, subjected to a reductive after-treatment if appropriate, washed, rinsed, and dried. The reductive after-treatment for the purpose of removing dyestuff constituents adhering to the surface of the fibres can be carried out be introducing the fabric, at 25°C, into a liquor containing 3–5 cm³/l of sodium hydroxide solution of 38° Be strength and 1–2 g/l of sodium dithionite (concentrated), heating the liquor to 70°C over the course of approx. 15 minutes and leaving it at 70°C for a further 10 minutes. Thereafter the fabric is rinsed hot, acidified with 2–3 cm³/l of 85% strength formic acid at 50°C, rinsed and dried. A brilliant pink dyeing is obtained, which is distinguished by its high dyestuff yield, very good build-up and excellent fastness properties, especially very good fastness to thermofixing, washing, rubbing and light.

An analogous dyeing is obtained if instead of polyethylene terephthalate fibres polyester fibres from 1,4-bis-(hydroxymethyl)-cyclohexane and terephthalic acid are used. Similarly, a brilliant pink dyeing is obtained if instead of polyethylene terephthalate fibres cellulose triacetate fibres are employed and the thermosol treatment is carried out at 215°C or if polyamide or polyurethane fibres are used and the thermosol is carried out at 190°–215°C.

EXAMPLE 4

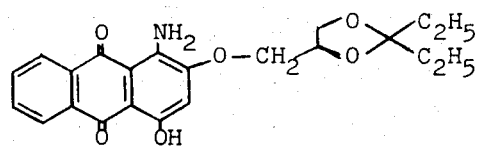

a. 25.6 parts of 2,2-diethyl-4-hydroxymethyl-dioxolane-(1,3) and 22.6 parts of ε-carpolactam are heated to give a melt. 8.3 parts of 1-amino-4-hydroxy-2-phenoxy-anthraquinone and 2.6 parts of potassium carbonate are added and the mixture is heated to 140°C until the reaction is complete (approx. 4 hours). The product is then precipitated at 70°C by means of 40 parts of methanol, filtered off after cooling, washed with methanol and water and dried. 7.4 parts (75%) of yellowish-tinged red crystals are obtained.

b. If in Example 4a, instead of 22.6 parts of ε-caprolactam, 14.6 parts of N,N-dimethylformamide or 20.2 parts of dimethylacetamide are used, the dyestuff is obtained in about the same reaction time and in similarly good yield and purity.

c. A previously cleaned and thermoset fabric of polyethylene terephthalate is printed with a paste consisting of the following components:

20 g of dyestuff obtained according to Example 4a, in a finely divided form,
520 g of water
450 g of crystal gum, 1:2 and
10 g of cresotic acid methyl ester.

Instead of crystal gum, an alginate thickener can also be used. To fix the dyestuff, the printed and dried goods are treated with hot air at 200°C or passed, at 190°–200°C, over a high output stenter frame or through a condensation apparatus. The duration of the treatment is 30–60 seconds. The resulting fixed print is subsequently rinsed cold, soaped with 1–2 g/l of anionic detergent for approx. 10 minutes at 70°–80°C, rinsed first hot and then cold, and dried. A clear print of very good fastness to light and sublimation is obtained.

a brilliant pink print is obtained in a similar manner if instead of polyethylene terephthalate fibres cellulose triacetate fibres, polyamide fibres or polyurethane fibres are employed.

EXAMPLE 5

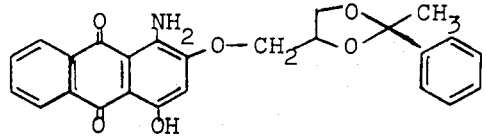

a. A mixture of 50 parts of 2-methyl-2-phenyl-4-hydroxy-methyl-dioxolane-(1,3), 2.6 parts of potassium carbonate and 8.3 parts of 1-amino-4-hydroxy-2-phenoxy-anthraquinone is heated to 160°C until, after about 10 hours, no further starting material is detectable. The product is then precipitated at 70°C with 56 parts of methanol, filtered off after cooling, washed with methanol and water and dried, and 8.5 parts (78%) of red crystals are obtained.

b. The same substance is obtained in similarly good yield and purity if instead of 8.3 parts of 1-amino-4-hydroxy-2-phenoxy-anthraquinone 6.8 parts of 1-amino-4-hydroxy-2-methoxyanthraquinone or 9.2 parts of 1-amino-4-hydroxy-2-(4chlorophenoxy)-anthraquinone are employed.

c. The same dyestuff can also be prepared by ketalisation of 1-amino-4-hydroxy-2-(2,3-dihydroxy-propoxy)-anthraquinone, the preparation of which is described, for example, in British Patent Specification 1,270,736 of 31.7.70, Example 6):

8.2 parts of 1-amino-4-hydroxy-2-(2,3-dihydroxy-propoxy)-anthraquinone, 10 parts of acetophenone, 150 parts of chloroform and 0.5 part of p-toluenesulphonic acid are distilled connected to a water separator, until not further water distills off azeotropically. Thereafter the reaction mixture is washed with sodium carbonate solution until neutral and evaporated. The crystalline dyestuff is filtered off, washed with methanol and dried. It is identical with the compound described under 5a).

The dyestuff dyes polyester and polyamide fibres in brilliant pink shades.

EXAMPLE 6

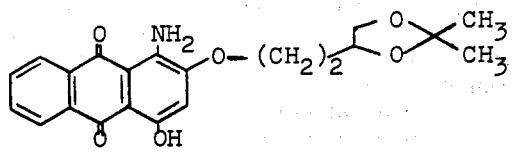

a. 50 parts of 2,2-dimethyl-4-(2-hydroxy-ethyl)-dioxoline-(1,3), 8.3 parts of 1-amino-4-hydroxy-2-phenoxy-anthraquinone and 2.6 parts of potassium carbonate are heated to 160°C. whilst stirring, until no further starting material is detectable (approx. 12 hours). The product is precipitated at 70°C with 80 parts of methanol and worked up as before, and 7.7 parts (80%) of red crystals are obtained.

b. The same dyestuff is obtained in similarly good yield and purity if instead of 8.3 parts of 1-amino-4-hydroxy-2-phenoxyanthraquinone, 6.9 parts of 1-amino-2-chloro-4-hydroxyanthraquinone, 8.0 parts of 1-amino-2-bromo-4-hydroxy-anthraquinone or 8.6 parts of sodium 1-amino-4-hydroxy-anthraquinone-2-sulphonate are used.

EXAMPLE 7

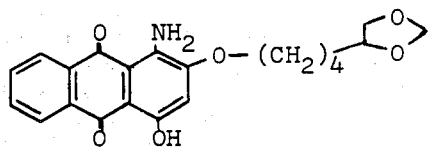

a. 22 parts of 4-(4-hydroxy-butyl)-dioxolane-(1,3) and 17 parts of ε-caprolactam are heated to give a clear melt, 8.3 parts of 1-amino-4-hydroxy-2-phenoxy-anthraquinone and 2.6 parts of potassium carbonate are added and the mixture is stirred at 140°C until reaction is complete (approx. 5 hours). The product is then precipitated at 70°C by means of 24 parts of methanol and worked up as before. 8.6 parts (89%) of redbrown crystals are obtained.

b. If the procefure indicated in Example 7a is followed, but using 29.2 parts of 4-(4-hydroxy-butyl)-dioxolane-(1,3) and 19.8 parts of N-methyl-pyrrolidone-(2), and the product is precipitated with 40 parts of methanol, 7.2 parts (75%) of the same compound are obtained after approx. 4 hours' reaction and the customary working up.

c. If, in the preceding example, 24.0 parts of sulpholane are used instead of 19.8 parts of N-methyl-pyrrolidone-(2), 7.4 parts (77%) of the same compound are obtained after 6 hours' reaction.

d. If the procedure according to Example 7b is followed, but using 15.6 parts of dimethylsulphoxide instead of 19.8 parts of N-methyl-pyrrolidone-(2), 7.6 parts (79%) of the same compound are obtained after 5 hours' reaction and precipitation with 60 parts of water.

e. Equally, this dyestuff is obtained in good yield and purity is pyridine is used as the solvent.

f. 1 part of this dyestuff, which has beforehand been brought to a finely divided stage in the presence of dispersing agents, is dispersed in 400 parts of water. 100 parts of polyester fibres (polyethylene terephthalate) are dyed for 120 minutes at the boil in the resulting dyebath, in the presence of 15 parts of o-cresotic acid methyl ester as the carrier. A brilliant, clear yellowish-tinged pink dyeing of very good fastness to light, wet processing and sublimation is obtained.

g. 100 parts of polyamide fabric are dyed for 1 hour at 100°C in 4,000 parts of water with 1 part of the dyestuff manufactured in this way, which has beforehand been brought to a finely divided state in accordance with the customary methods. The fabric is subsequently rinsed warm and cold and dried. A clear pink dyeing of very good fastness to washing and to light is obtained.

Instead of polyamide fibres, polyurethane fibres can be used with equal success.

h. 20 parts of cellulose 2½-acetate fibres are dyed for 1 hour at 75°C in a liquor of 600 parts of water, 1 part of Marseilles soap and 0.2 part of the dyestuff mentioned in Example 7a, which has been brought to a finely divided state. A brilliant pink dyeing with good fastness to rubbing and to washing is obtained.

i. A dyebath is prepared with 1 part of the above dyestuff, which has beforehand been brought to a finely divided state using the auxiliaries customary for this purpose, 6 parts of fatty alcohol sulphonate and 3,000 parts of water, and 100 parts of cellulose triacetate fibres are dyed therein for 1 hour at 100°C. A yellowish-tinged red dyeing of very good fastness to washing, thermofixing, rubbing and light is obtained.

k. 100 parts of a fabric of texturised polyethylene terephthalate fibres are introduced at room temperature, without prior cleaning, into a dyebath which is prepared from 1 part of the dyestuff manufactured according to 7a and 1,000 parts of tetrachloroethylene. The bath is heated to 115°C over the course of 10 minutes whilst vigorously circulating the liquor and is kept at this temperature for 30 minutes. The liquor is then separated off and the dyed goods are rinsed with fresh solvent for 5 minutes at approx. 40°C. After removing the rinsing liquor, the dyed goods are centrifuged and dried in a stream of air. A strong pink dyeing of excellent fastness to sublimation and very good fastness to washing and to light is obtained.

An equivalent red dyeing was obtained analogously on a fabric of polycyclohexane-dimethylene-terephthalate fibres.

If the tetrachloroethylene is replaced by the same amount of 1,1,2-trichloroethane, an equivalent dyeing is obtained.

EXAMPLE 8

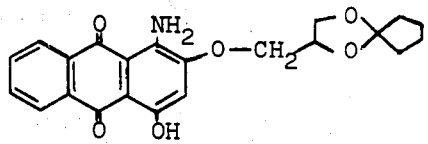

50 parts of 2-hydroxymethyl-1,4-dioxaspiro[4,4]nonane, 8.3 parts of 1-amino-4-hydroxy-2-phenoxy-anthraquinone and 2.6 parts of potassium carbonate are heated to 160°C until the starting material has been completely converted (approx. 5.5 hours). Thereafter the mixture is diluted, at 70°C, with 40 parts of methanol and worked up as before. 8.2 parts (82% of yellowish-tinged red crystals are obtained. The dyestyff dyes polyester fibres and polyamide fibres in brilliant pink shades.

EXAMPLE 9 – 162

The anthraquinone compounds listed in Table 1, which give the indicated shades on woven fabrics or knitted fabrics of polyester, triacetate, polyamide, polyurethane or polyolefine fibres, are manufactured analogously to the description in Examples 1 – 8.

Table 1

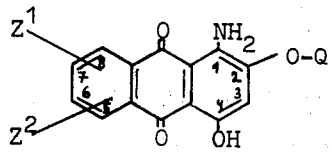

| Example No | Q | $Z^1$ | $Z^2$ | Colour shade |
|---|---|---|---|---|
| 9 | -CH$_2$-(dioxolane) | H | H | Pink |
| 10 | -CH$_2$-(dioxolane-CH$_3$) | H | H | Pink |
| 11 | -CH$_2$-(dioxolane-CH$_2$-CH$_3$) | H | H | Yellowish-tinged pink |
| 12 | -CH$_2$-(dioxolane-CH$_2$-CH$_2$-CH$_3$) | H | H | Yellowish-tinged pink |
| 13 | -CH$_2$-(dioxolane-CH$_2$-CH$_2$-CH$_2$-CH$_3$) | H | H | Pink |
| 14 | -CH$_2$-(dioxolane-CH(CH$_3$)-CH$_2$-CH$_3$) | H | H | Pink |
| 15 | -CH$_2$-(dioxolane-CH$_2$-CH(CH$_3$)$_2$) | H | H | Yellowish-tinged pink |
| 16 | -CH$_2$-(dioxolane-C(CH$_3$)$_3$) | H | H | Pink |
| 17 | -CH$_2$-(dioxolane-(CH$_2$)$_4$-CH$_3$) | H | H | Yellowish-tinged pink |

Table 1 — Continued

| Example No. | Q | $Z^1$ | $Z^2$ | Colour shade |
|---|---|---|---|---|
| 18 | 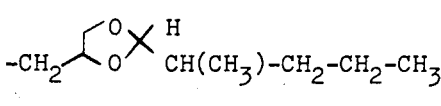 -CH₂-CH(O-)(O-)CH(CH₃)-CH₂-CH₂-CH₃ | H | H | Pink |
| 19 | -CH₂-CH(O-)(O-)CH-CH₂-CH(CH₃)-CH₂-CH₃ | H | H | Pink |
| 20 | -CH₂-CH(O-)(O-)CH-CH₂-CH₂-CH(CH₃)₂ | H | H | Pink |
| 21 | -CH₂-CH(O-)(O-)CH-CH(CH₂-CH₃)₂ | H | H | Yellowish-tinged pink |
| 22 | -CH₂-CH(O-)(O-)CH-CH₂-CH(CH₃)-CH₂-CH₃ | H | H | Pink |
| 23 | -CH₂-CH(O-)(O-)CH-CH₂-C(CH₃)₃ | H | H | Pink |
| 24 | -CH₂-CH(O-)(O-)CH-CH₂-C₆H₅ | H | H | Yellowish-tinged pink |
| 25 | -CH₂-CH(O-)(O-)CH-CH₂-C₆H₄-CH₃ | H | H | Pink |
| 26 | -CH₂-CH(O-)(O-)CH-CH₂-C₆H₄-O-CH₃ | H | H | Pink |
| 27 | -CH₂-CH(O-)(O-)CH-CH₂-C₆H₄-Cl | 7-Cl | H | Pink |
| 28 | -CH₂-CH(O-)(O-)CH-C₆H₄-CH₃ | H | H | Pink |
| 29 | -CH₂-CH(O-)(O-)CH-C₆H₃(CH₃)₂ | H | H | Pink |
| 30 | -CH₂-CH(O-)(O-)CH-C₆H₄-CH₂-CH₃ | H | H | Pink |
| 31 | -CH₂-CH(O-)(O-)CH-C₆H₄-OCH₃ (ortho) | H | H | Yellowish-tinged pink |
| 32 | -CH₂-CH(O-)(O-)CH-C₆H₄-OCH₃ (para) | H | H | Pink |

Table 1 —Continued
| Example No. | Q | $Z^1$ | $Z^2$ | Colour shade |
|---|---|---|---|---|
| 33 | 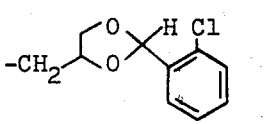 | H | H | Pink |
| 34 | 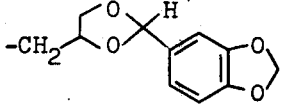 | H | H | Yellowish-tinged pink |
| 35 | 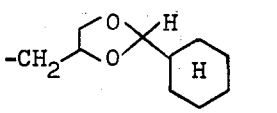 | 5-Cl | H | Pink |
| 36 | 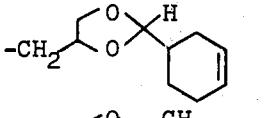 | H | H | Pink |
| 37 | 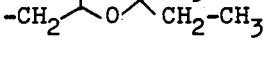 | H | H | Yellowish-tinged pink |
| 38 | 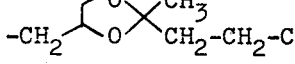 | H | H | Yellowish-tinged pink |
| 39 | 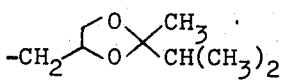 | H | H | Yellowish-tinged pink |
| 40 | 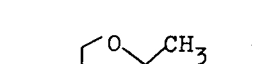 | H | H | Pink |
| 41 | 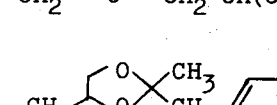 | H | H | Pink |
| 42 | 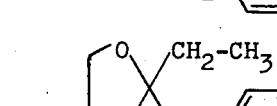 | H | H | Pink |
| 43 | 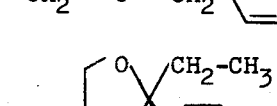 | H | H | Yellowish-tinged pink |
| 44 | 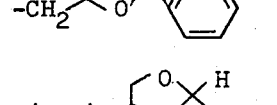 | H | H | Pink |
| 45 | 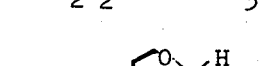 | H | H | Yellowish-tinged pink |
| 46 | 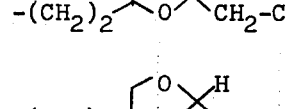 | H | H | Yellowish-tinged pink |
| 47 | 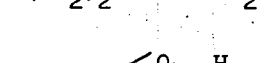 | H | H | Yellowish-tinged pink |
| 48 | 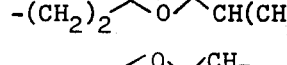 | H | H | Pink |

Table 1—Continued

| Example No. | Q | $Z^1$ | $Z^2$ | Colour shade |
|---|---|---|---|---|
| 49 | -(CH$_2$)$_2$-CH(O-CH$_2$-O)-CH$_2$-C$_6$H$_5$ (with H) | 6-Cl | H | Pink |
| 50 | -(CH$_2$)$_2$-CH(O-CH(H)-O)-C$_6$H$_5$ | H | H | Yellowish-tinged pink |
| 51 | -(CH$_2$)$_2$-CH(O-CH(H)-O)-C$_6$H$_4$-O-CH$_3$ | H | H | Yellowish-tinged pink |
| 52 | -(CH$_2$)$_4$-CH(O-CH(H)-O)-CH$_2$-CH$_3$ | H | H | Pink |
| 53 | -(CH$_2$)$_4$-CH(O-CH(H)-O)-CH$_2$-CH$_2$-CH$_3$ | H | H | Yellowish-tinged pink |
| 54 | -(CH$_2$)$_4$-CH(O-CH(H)-O)-CH(CH$_3$)$_2$ | H | H | Yellowish-tinged pink |
| 55 | -(CH$_2$)$_4$-CH(O-CH(H)-O)-CH$_2$-C$_6$H$_5$ | H | H | Pink |
| 56 | -(CH$_2$)$_4$-CH(O-CH(H)-O)-C$_6$H$_5$ | H | H | Yellowish-tinged pink |
| 57 | -(CH$_2$)$_4$-CH(O-C(CH$_3$)(CH$_3$)-O) | H | H | Pink |
| 58 | -(CH$_2$)$_4$-CH(O-C(CH$_3$)(CH$_2$-CH$_3$)-O) | H | H | Yellowish-tinged pink |
| 59 | -(CH$_2$)$_4$-CH(O-C(CH$_3$)(CH$_2$-CH$_2$-CH$_3$)-O) | H | H | Pink |
| 60 | -(CH$_2$)$_4$-CH(O-C(CH$_3$)(CH(CH$_3$)$_2$)-O) | H | H | Pink |
| 61 | -(CH$_2$)$_4$-CH(O-C(CH$_3$)(CH$_2$-C$_6$H$_5$)-O) | H | H | Pink |
| 62 | -(CH$_2$)$_4$-CH(O-C(CH$_3$)(C$_6$H$_5$)-O) | H | H | Yellowish-tinged pink |
| 63 | -CH$_2$-C(O-CH$_2$-O)(CH$_3$) | 8-Cl | H | Pink |
| 64 | -CH$_2$-C(O-C(CH$_3$)(CH$_3$)-O)(CH$_2$-CH$_3$) | H | H | Pink |

Table 1 —Continued

| Example No. | Q | $Z^1$ | $Z^2$ | Colour shade |
|---|---|---|---|---|
| 65 | -(CH$_2$)$_2$-C(CH$_3$)(O-CH-H)(O-CH$_2$-CH$_3$) | H | H | Pink |
| 66 | -(CH$_2$)$_2$-C(CH$_2$-CH$_3$)(O-CH$_3$)(O-C(CH$_3$)$_2$) | 5-Cl | H | Pink |
| 67 | -(CH$_2$)$_4$-CH(O-)(O-)CH$_3$ | H | H | Pink |
| 68 | -(CH$_2$)$_4$-C(CH$_2$-CH$_3$)(O-CH$_3$)(O-C(CH$_3$)$_2$) | 6-Cl | 7-Cl | Pink |
| 69 | -CH$_2$-CH(O-(CH$_2$)$_2$-CH$_3$)(O-(CH$_2$)$_2$-CH$_3$) | H | H | Pink |
| 70 | -CH$_2$-CH(O-(CH$_2$)$_2$-CH$_3$)(O-CH$_2$-CH(CH$_3$)$_2$) | H | H | Yellowish-tinged pink |
| 71 | -CH$_2$-CH(O-(CH$_2$)$_4$-CH$_3$)(O-CH$_2$-C$_6$H$_5$) | 5-F | H | Pink |
| 72 | -CH$_2$-CH(O-(CH$_2$)$_4$-CH$_3$)(O-CH$_2$-CH(CH$_3$)-CH$_2$-CH$_3$) | 6-F | H | Pink |
| 73 | -CH$_2$-CH(O-CH$_2$-CO-O-CH$_3$)(O-CH$_2$-CO-O-CH$_3$) | H | H | Pink |
| 74 | -CH$_2$-C(CH$_3$)(O-)(O-CH$_2$-O-CH$_3$) | H | H | Red |
| 75 | -CH$_2$-C(CH$_3$)(O-)(O-CH$_2$-O-(CH$_2$)$_2$-CH$_3$) | H | H | Pink |
| 76 | -CH$_2$-C(CH$_3$)(O-)(O-CH$_2$-CH$_2$-O-CH$_3$) | H | H | Pink |
| 77 | -CH$_2$-C(CH$_3$)(O-)(O-CH$_2$-CH$_2$-CH$_2$-O-CH$_3$) | H | H | Pink |
| 78 | -CH$_2$-C(CH$_3$)(O-)(O-CH$_2$-O-CH$_2$-CH$_2$-O-CH$_3$) | H | H | Pink |
| 79 | -CH$_2$-C(CH$_3$)(O-)(O-CH$_2$-CH$_2$-S-CH$_3$) | 7-F | H | Pink |
| 80 | -CH$_2$-C(CH$_3$)(O-)(O-CH$_2$-Cl) | 8-F | H | Pink |

Table 1—Continued
| Example No. | Q | $Z^1$ | $Z^2$ | Colour shade |
|---|---|---|---|---|
| 81 | 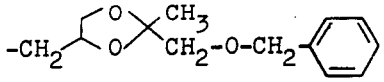 | H | H | Pink |
| 82 | 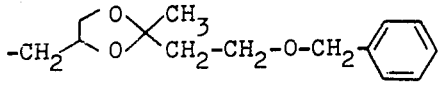 | H | H | Pink |
| 83 | 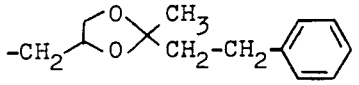 | H | H | Pink |
| 84 | 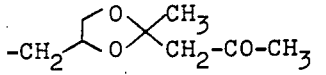 | H | H | Pink |
| 85 | 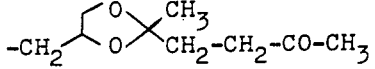 | H | H | Pink |
| 86 | 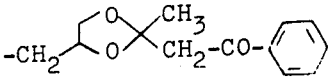 | H | H | Pink |
| 87 | 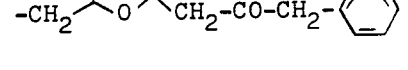 | H | H | Pink |
| 88 | 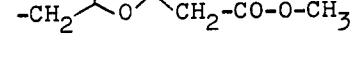 | H | H | Yellowish-tinged pink |
| 89 | 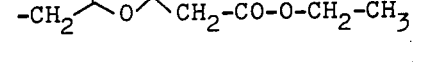 | H | H | Yellowish-tinged pink |
| 90 | 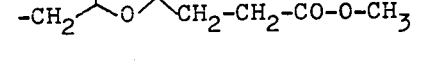 | H | H | Pink |
| 91 | 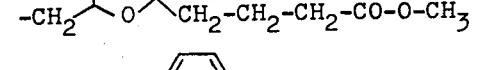 | H | H | Red |
| 92 | 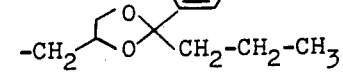 | H | H | Yellowish-tinged pink |
| 93 | 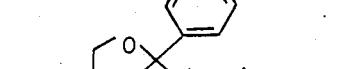 | 5-F | H | Pink |
| 94 | 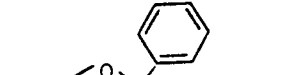 | H | H | Yellowish-tinged pink |
| 95 | 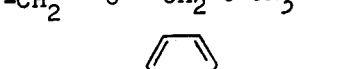 | H | H | Pink |
| 96 | 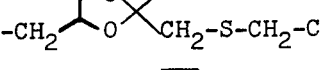 | H | H | Pink |

Table 1 –Continued
| Example No. | Q | $Z^1$ | $Z^2$ | Colour shade |
|---|---|---|---|---|
| 97 | 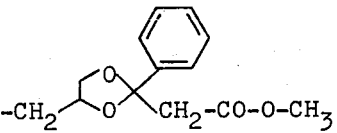 | H | H | Pink |
| 98 | 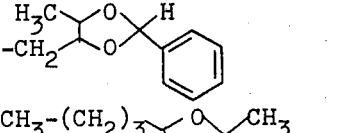 | H | H | Red |
| 99 | 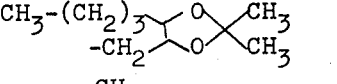 | 6-F | 7-F | Pink |
| 100 | 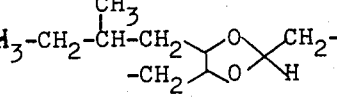 | H | H | Red |
| 101 | 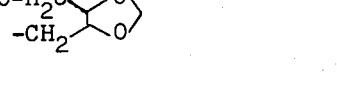 | H | H | Yellowish-tinged pink |
| 102 | 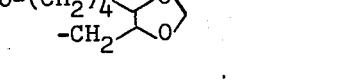 | H | H | Yellowish-tinged pink |
| 103 | 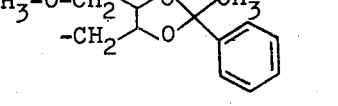 | H | H | Pink |
| 104 | 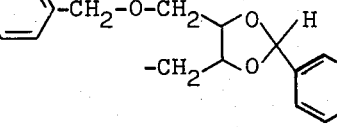 | H | H | Pink |
| 105 | 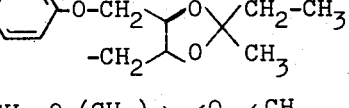 | H | H | Pink |
| 106 | 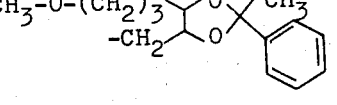 | H | H | Pink |
| 107 | 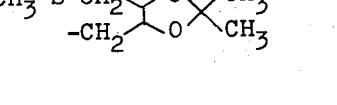 | H | H | Pink |
| 108 | 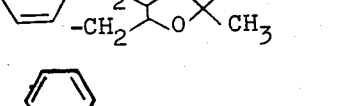 | H | H | Yellowish-tinged pink |
| 109 | 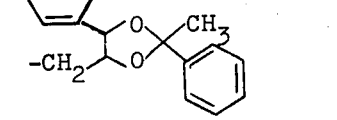 | H | H | Pink |
| 110 | 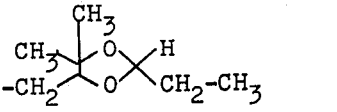 | H | H | Pink |

Table 1 – Continued
| Example No. | Q | $Z^1$ | $Z^2$ | Colour shade |
|---|---|---|---|---|
| 111 | 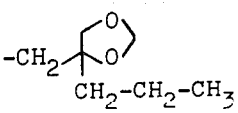 | H | H | Pink |
| 112 | 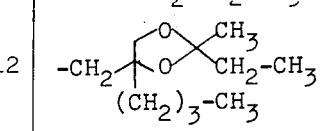 | H | H | Pink |
| 113 | 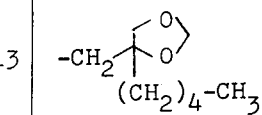 | H | H | Pink |
| 114 | 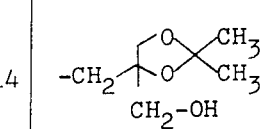 | H | H | Pink |
| 115 | 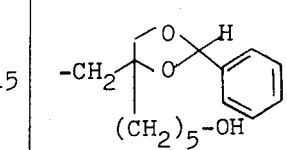 | H | H | Yellowish-tinged pink |
| 116 | 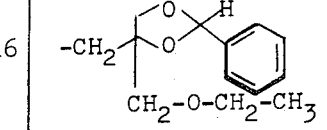 | H | H | Pink |
| 117 | 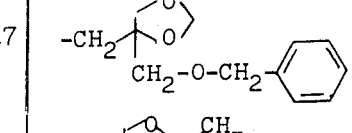 | H | H | Pink |
| 118 | 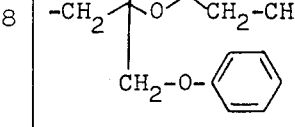 | H | H | Pink |
| 119 | 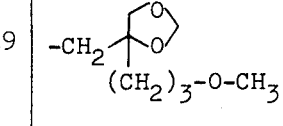 | H | H | Yellowish-tinged pink |
| 120 | 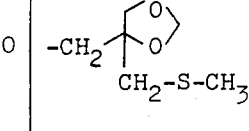 | H | H | Red |
| 121 | 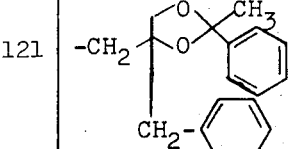 | H | H | Pink |
| 122 | 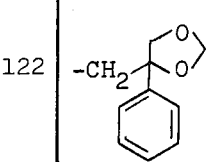 | H | H | Pink |

Table 1—Continued
| Example No | Q | $Z^1$ | $Z^2$ | Colour shade |
|---|---|---|---|---|
| 123 | 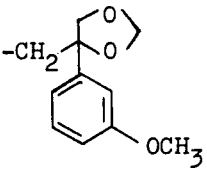 | H | H | Pink |
| 124 | 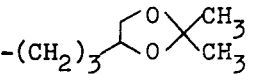 | H | H | Yellowish-tinged pink |
| 125 | 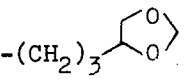 | H | H | Yellowish-tinged pink |
| 126 | 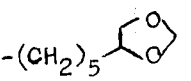 | H | H | Yellowish-tinged pink |
| 127 | 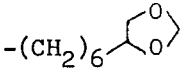 | H | H | Yellowish-tinged pink |
| 128 | 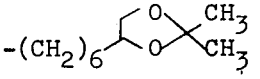 | H | H | Yellowish-tinged pink |
| 129 | 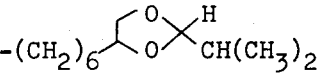 | H | H | Yellowish-tinged pink |
| 130 | 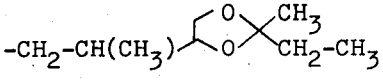 | H | H | Pink |
| 131 | 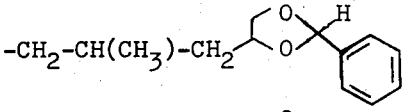 | H | H | Pink |
| 132 | 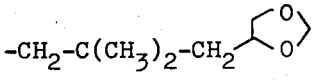 | H | H | Pink |
| 133 | 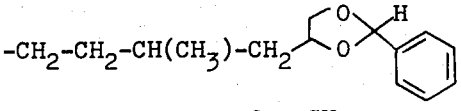 | H | H | Pink |
| 134 | 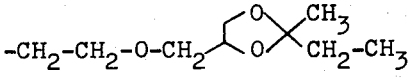 | H | H | Pink |
| 135 | 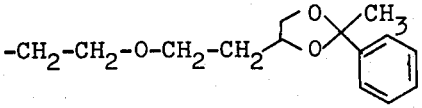 | H | H | Yellowish-tinged pink |
| 136 | 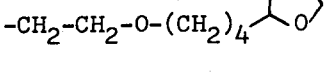 | H | H | Yellowish-tinged pink |
| 137 | 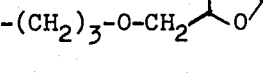 | H | H | Yellowish-tinged pink |
| 138 | 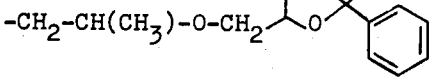 | H | H | Pink |

Table 1 – Continued

| Example No. | Q | $Z^1$ | $Z^2$ | Colour shade |
|---|---|---|---|---|
| 139 | -(CH$_2$)$_4$-O-(CH$_2$)$_4$- 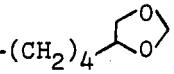 | H | H | Yellowish-tinged pink |
| 140 | -CH$_2$-CH$_2$-S-CH$_2$- 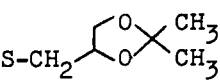 | H | H | Pink |
| 141 | -CH$_2$-CH$_2$-S-(CH$_2$)$_4$- 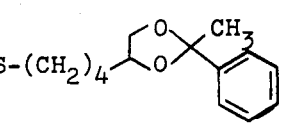 | H | H | Pink |
| 142 | -CH$_2$-CH$_2$-SO$_2$-CH$_2$- 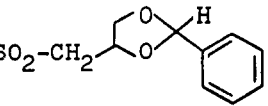 | H | H | Pink |
| 143 | -CH$_2$-CH$_2$-SO$_2$-(CH$_2$)$_4$- 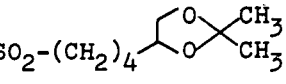 | H | H | Pink |
| 144 | -CH$_2$-CH$_2$-O-CH$_2$-CH$_2$-O-CH$_2$- 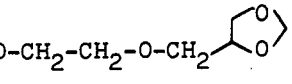 | H | H | Yellowish-tinged pink |
| 145 | -CH$_2$-  | H | H | Pink |
| 146 | -(CH$_2$)$_2$-  | H | H | Pink |
| 147 | -(CH$_2$)$_4$- 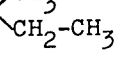 | H | H | Pink |
| 148 | -CH$_2$- 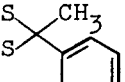 | H | H | Pink |
| 149 | -(CH$_2$)$_2$- 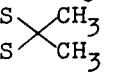 | H | H | Pink |
| 150 | -(CH$_2$)$_4$- 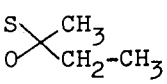 | H | H | Pink |
| 151 | -CH$_2$- 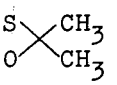 | H | H | Pink |
| 152 | -(CH$_2$)$_2$- 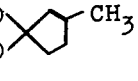 | H | H | Pink |
| 153 | -(CH$_2$)$_4$-  | H | H | Pink |
| 154 | -(CH$_2$)$_2$- | H | H | Pink |
| 155 | -(CH$_2$)$_4$- | H | H | Pink |

Table 1 — Continued

| Example No. | Q | $Z^1$ | $Z^2$ | Colour shade |
|---|---|---|---|---|
| 156 | -CH₂-[dioxolane-cyclohexane spiro] | H | H | Pink |
| 157 | -(CH₂)₂-[dioxolane-(methylcyclohexane) spiro] | 5-F | H | Yellowish-tinged pink |
| 158 | -(CH₂)₄-[dioxolane-(trimethylcyclohexane) spiro] | H | H | Yellowish-tinged pink |
| 159 | -CH₂-[dioxolane-tetrahydropyran spiro] | H | H | Pink |
| 160 | -(CH₂)₄-[dioxolane-tetrahydropyran spiro] | H | H | Yellowish-tinged pink |
| 161 | -CH₂-[dioxolane-tetrahydrothiopyran spiro] | 5-Cl | H | Pink |
| 162 | -(CH₂)₂-[dioxolane-tetrahydrothiopyran spiro] | H | H | Pink |

EXAMPLE 163

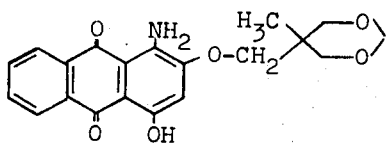

8.3 parts of 1-amino-4-hydroxy-2-phenoxy-anthraquinone and 2.6 parts of potassium carbonate are introduced into a melt of 26.4 parts of 5-methyl-5-hydroxymethyl-dioxane-(1,3) and 22.6 parts of ε-caprolactam and the mixture is heated to 140°C, whilst stirring, until no further starting material is detectable (approx. 9.5 hours). The reaction mixture is diluted with 40 parts of methanol at 70°C and is worked up as previously described. 7.5 parts (81%) of red-brown crystals are obtained.

EXAMPLE 164 a. A mixture of 50 parts of 2,2-dimethyl-5-ethyl-5-hydroxy-methyl-dioxane-(1,3), 8.3 parts of 1-amino-4-hydroxy-2-phenoxy-anthraquinone and 2.6 parts of potassium carbonate is heated to 160°C for approx. 16 hours until the reaction is complete. The product is precipitated, at 70°C, with 48 parts of methanol and worked up as before, and 7.0 parts (67%) of red crystals are obtained.

b. A fabric of polyethylene terephthalate fibres is impregnated, at room temperature, with a clear red solution which contains 10 parts of the dyestuff according to Example 164a and 7 parts of nonylphenol heptaethyleneglycol ether in 983 parts of tetrachloroethylene. After squeezing out to a weight increase of 60%, the fabric is dried for one minute at 80°C. Thereafter the dyestuff is fixed by heating the fabric to 190°– 220°C for 45 seconds. The small proportion of non-fixed dyestuff is then eluted by brief rinsing with cold tetrachloroethylene. After drying, a clear pink dyeing is obtained, which is distinguished by its very good build-up and by its good fastness properties.

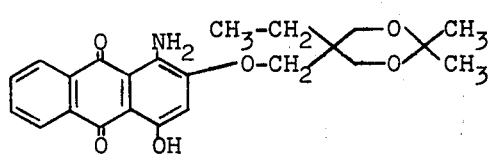

EXAMPLE 165

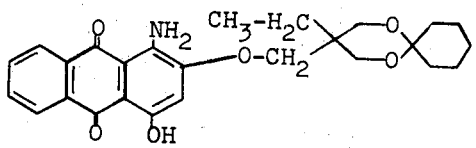

a. A mixture of 50 parts of 9-ethyl-9-hydroxymethyl-1,5-dioxaspiro[5,5]undecane, 8.3 parts of 1-amino-4-hydroxy-2-phenoxy-anthraquinone and 2.6 parts of potassium carbonate is heated to 160°C, whilst stirring, until the reaction has ended (approx. 18 hours), and is then diluted, at 70°C, with 48 parts of methanol and worked up as before, and 8.0 parts (70%) of red crystals are obtained.

b. A fabric of polyethylene terephthalate fibres is impregnated, at room temperature, with a clear red solution which contains 10 parts of the dyestuff manufactured according to Example 165a in 990 parts of tetrachloroethylene. After squeezing out to a weight increase of 60%, the fabric is dried for 1 minute at 80°C. Thereafter the dyestuff is fixed by heating the fabric to 190°–220°C for 45 seconds and the small proportion of non-fixed dyestuff is then eluted by a brief treatment of 20 seconds in cold tetrachloroethylene. After drying, a clear, yellowish-tinged pink dyeing is obtained, which is distinguished by its high dyestuff yield, very good build-up and very good fastness properties, especially very good fastness to thermofixing, washing, rubbing and light.

Equivalent pink dyeings were also obtained analogously on fabrics of (a) cellulose triacetate, (b) synthetic polyamides or polyurethanes and (c) polypropylene fibres, except that the thermosol treatment was carried out at 200°–220°C for (a), at 170° – 200°C for (b) and at 120° – 150°C for (c).

Equivalent dyeings were also obtained when the 990 parts of tetrachloroethylene were replaced by the same amount of one of the following solvents: methylene chloride, carbon tetrachloride, dichloroethane, trichloroethane, trichloroethylene, tetrachloroethane, 1,1,1-trichloropropane, pentachloropropane, chlorobutane, dichlorobutane, dichlorohexane, perfluoro-n-hexane, 1,2,2-trifluoro-trichloroethane, 1,1,1-trifluoro-pentachloropropane, chloroform and dichloropropane.

EXAMPLES 166 – 146

The dyestuffs listed in Table 2 are manufactued analogously to the description in Examples 1 – 8 and 163 – 165. They give the indicated shades on woven fabrics or knitted fabrics of polyester, triacetate, polyamide, polyurethane or polyolefine fibres.

Table 2

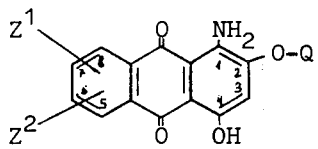

| Example No. | Q | $Z^1$ | $Z^2$ | Colour shade |
|---|---|---|---|---|
| 166 | -CH₂- (1,3-dioxolan-2-yl, H) | H | H | Yellowish-tinged pink |
| 167 | -CH₂- (CH₃, O, O, CH(CH₃)₂, H) | H | H | Yellowish-tinged pink |
| 168 | -CH₂- (CH₃, O, O, C(CH₃)₃) | H | H | Pink |
| 169 | -CH₂- (CH₃, O, O, CH(phenyl), H) | H | H | Pink |
| 170 | -CH₂- (CH₃-CH₂, O, O) | H | H | Pink |
| 171 | -CH₂- (CH₃-CH₂, O, O, CH(CH₂-CH₂-CH₃), H) | H | H | Pink |
| 172 | -CH₂- (CH₃-CH₂, O, O, CH(phenyl), H) | H | H | Pink |
| 173 | -CH₂- (CH₃-CH₂, O, O, CH(cyclohexyl), H) | H | H | Pink |
| 174 | -CH₂-CH₂- (CH₃-CH₂, O, O, CH(CH₃)₂, H) | H | H | Pink |

Table 2 – Continued

| Example No. | Q | $Z^1$ | $Z^2$ | Colour shade |
|---|---|---|---|---|
| 175 | -CH₂-CH₂-C(CH₃)(O-)CH₂-C(CH₃)(CH₃)-O- (dioxane ring, 2,2,5,5-substituted; ring attached via -CH₂-CH₂-, with CH₃ groups) | H | H | Pink |
| 176 | -CH₂-CH₂- attached to dioxane ring with CH₃-CH₂ and CH₃, and CH₂-CH₃ substituents | H | H | Yellowish-tinged pink |
| 177 | -(CH₂)₄- attached to dioxane ring with CH₃ substituent | H | H | Yellowish-tinged pink |
| 178 | -(CH₂)₄- attached to dioxane ring with CH₃ and CH(phenyl) substituents | H | H | Yellowish-tinged pink |
| 179 | -(CH₂)₄- attached to dioxane ring with CH₃-CH₂ substituent | H | H | Yellowish-tinged pink |
| 180 | -(CH₂)₄- attached to dioxane ring with CH₃-CH₂ and CH(CH₂-CH₃)(H) substituents | H | H | Pink |
| 181 | -CH₂- attached to dioxane ring with H and (CH₂-CH₃)₂ substituents | H | H | Pink |
| 182 | -CH₂- attached to dioxane ring with H and CH₂-CH₃, CH(CH₃)₂ substituents | H | H | Pink |
| 183 | -CH₂- attached to dioxane ring with CH₃ and CH₂-CH₃, phenyl substituents | H | H | Pink |
| 184 | -CH₂- attached to dioxane ring with CH₃ and (CH₂-phenyl)₂ substituents | H | H | Pink |
| 185 | -CH₂- attached to dioxane ring with (CH₃-CH₂) and CH₂-CH₃, (CH₂)₃-CH₃ substituents | H | H | Yellowish-tinged pink |
| 186 | -CH₂- attached to dioxane ring with CH₃-CH₂ and (CH₂-phenyl)₂ substituents | H | H | Pink |
| 187 | -CH₂- attached to dioxane ring with CH₃ and CH₃, CH₂-O-CH₃ substituents | H | H | Yellowish-tinged pink |
| 188 | -CH₂- attached to dioxane ring with CH₃ and CH₃, CH₂-CO-CH₃ substituents | H | H | Yellowish-tinged pink |
| 189 | -CH₂- attached to dioxane ring with CH₃-CH₂ and CH₃, CH₂-CO-phenyl substituents | H | H | Pink |
| 190 | -CH₂- attached to dioxane ring with CH₃-CH₂ and CH₃, CH₂-CO-O-CH₃ substituents | H | H | Pink |

Table 2 – Continued

| Example No. | Q | $Z^1$ | $Z^2$ | Colour shade |
|---|---|---|---|---|
| 191 | -CH₂-C(CH₃)(CH₂O-)(O-)C(C₆H₅)(CH₂-CH₂-CH₃) | H | H | Pink |
| 192 | -CH₂-C(CH₃)(CH₂O-)(O-)C(C₆H₅)(CH₂-O-CH₂-C₆H₅) | H | H | Yellowish-tinged pink |
| 193 | -CH₂-C(CH₂-CH₃)(CH₂O-)(O-)C(C₆H₅)(CH₂-CO-CH₃) | H | H | Pink |
| 194 | -CH₂-C(CH₂-CH₃)(CH₂O-)(O-)C(C₆H₅)(CH₂-CO-O-CH₂-CH₃) | H | H | Pink |
| 195 | -CH₂-C(CH₃)(CH₂O-)(O-)CH(CH₃) | H | H | Pink |
| 196 | -CH₂-C(CH₃)(CH₂O-)(O-)C(CH₃)(CH₃) with CH₂-OH | H | H | Pink |
| 197 | -CH₂-C(CH₂-CH₃)(CH₂O-)(O-)CH(C₆H₅) with CH₂-O-CH₃ | H | H | Pink |
| 198 | -CH₂-C(CH₂-CH₃)(CH₂O-)(O-)CH with CH₂-C₆H₅ | H | H | Pink |
| 199 | -CH₂-C(CH₃)(CH₂O-)(O-)C(CH₃)(CH₃) with CH₃ | 5-Cl | H | Pink |
| 200 | -CH₂-C(CH₃)(CH₂O-)(O-)C(CH₃)(CH₃) with CH₂-CH₃ | 6-Cl | H | Pink |
| 201 | CH₃-(CH₂)₄-C(CH₂O-)(O-) | 7-Cl | H | Pink |
| 202 | HO-CH₂-C(CH₂O-)(O-) | H | H | Pink |
| 203 | HO-(CH₂)₅-C(CH₂O-)(O-)CH(H)(CH₂-CH₃) | H | H | Pink |

Table 2—Continued

| Example No. | Q | $Z^1$ | $Z^2$ | Colour shade |
|---|---|---|---|---|
| 204 | CH₃-CH₂-O-CH₂-C(CH₂)(CH₂)(O-CH(H)-O) phenyl | H | H | Pink |
| 205 | phenyl-CH₂-C(CH₂)(CH₂)(O-C(CH₃)(phenyl)-O) | 6-Cl | 7-Cl | Pink |
| 206 | CH₃-O-C₆H₄-C(CH₂)(CH₂)(O-C(CH₃)₂-O) | 8-Cl | H | Pink |
| 207 | CH₃-O-CH₂-(O-CH₂-O) | H | H | Pink |
| 208 | -(CH₂)₃-C(CH₃)(O-CH(H)-O-CH₂-CH₃) | H | H | Yellowish-tinged pink |
| 209 | CH₃-CH₂-(CH₂)₆-(O-CH₂-O) | H | H | Yellowish-tinged pink |
| 210 | -CH₂-C(CH₃)₂-CH₂-C(CH₃)(O-CH(H)-O)phenyl | 8-F | H | Pink |
| 211 | -CH₂-CH₂-O-CH₂-C(CH₃)(O-C(CH₃)₂-O) | H | H | Yellowish-tinged pink |
| 212 | -CH₂-CH₂-O-(CH₂)₄-C(CH₂-CH₃)(O-CH₂-O) | H | H | Pink |
| 213 | -(CH₂)₄-O-(CH₂)₄-C(CH₃)(O-CH₂-O) | H | H | Pink |
| 214 | -(CH₂)₂-S-CH₂-C(CH₃)(O-C(CH₃)(phenyl)-O) | 7-F | H | Pink |
| 215 | -(CH₂)₂-SO₂-CH₂-C(CH₃)(O-CH₂-O) | 6-F | 7-F | Red |
| 216 | -CH₂-C(CH₃)(CH₃)-C(CH₃)(O)-C(CH₃)(CH₃)-O | H | H | Pink |
| 217 | -CH₂-C(CH₃)(CH₃)-C(O)-CH(H)(O)-phenyl-(CH₂)₃-CH₃ | H | H | Pink |
| 218 | CH₃-CH₂-C(CH₃)(O-CH₂-O)-CH₂-CH₂-CH₂-O-CH₃ | H | H | Pink |

Table 2 – Continued

| Example No | Q | $Z^1$ | $Z^2$ | Colour shade |
|---|---|---|---|---|
| 219 | [structure] | H | H | Pink |
| 220 | [structure] | 5-F | H | Pink |
| 221 | [structure] | 6-F | H | Pink |
| 222 | [structure] | H | H | Pink |
| 223 | [structure] | H | H | Pink |
| 224 | [structure] | H | H | Pink |
| 225 | [structure] | H | H | Pink |
| 226 | [structure] | H | H | Pink |
| 227 | [structure] | H | H | Pink |
| 228 | [structure] | 5-Cl | 8-Cl | Pink |
| 229 | [structure] | 5-F | 8-F | Pink |
| 230 | [structure] | H | H | Pink |
| 231 | [structure] | H | H | Pink |
| 232 | [structure] | H | H | Pink |
| 233 | [structure] | H | H | Pink |
| 234 | [structure] | H | H | Pink |

Table 2 – Continued

| Example No. | Q | $Z^1$ | $Z^2$ | Colour shade |
|---|---|---|---|---|
| 235 | CH₃-CH₂ / -CH₂ spiro[5.5] with O,O and CH₃ | H | H | Pink |
| 236 | CH₃ / -CH₂ spiro with O,O and O | H | H | Yellowish-tinged pink |
| 237 | CH₃-CH₂ / -CH₂ spiro with O,O and O | H | H | Yellowish-tinged pink |
| 238 | CH₃ / -CH₂ spiro with O,O and S | 6-F | 7-Cl | Pink |
| 239 | CH₃-CH₂ / -CH₂ spiro with O,O and S | 7-Br | H | Pink |
| 240 | H₃C-C(O)(O)-C(CH₃)(CH₃) / -CH₂ | H | H | Pink |
| 241 | -CH₂-CH₂- dioxolane | H | H | Pink |
| 242 | -CH₂- dioxane with H, phenyl | H | H | Pink |
| 243 | -(CH₂)₄- dioxane with CH₃, H₃C | H | H | Pink |
| 244 | CH₃-CH₂-C(-CH₂)(O-C(CH₃)₂-O-)CH₂-CH₂-phenyl | H | H | Pink |
| 245 | dioxane-phenyl, H | H | H | Pink |
| 246 | dioxane with CH₃,CH₃ | H | H | Pink |

We claim:
1. Anthraquinone dyestuff of the formula

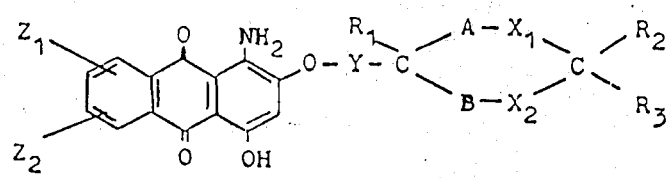

in which

Y is a direct bond, $C_1$-$C_6$-alkylene, or $C_1$-$C_6$-alkylene interrupted by oxygen, sulfur, or sulphone;
A is alkylene of the formula

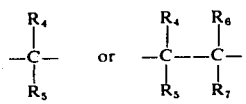

B is a direct bond or an alkylene of the formula

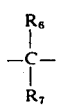

with the proviso that B is a direct bond if A is

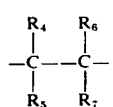

$R_1$, $R_4$, $R_5$, $R_6$, and $R_7$, independently of each other, are hydrogen, $C_1$–$C_5$-alkyl, or $C_1$–$C_5$-alkyl substituted by chloro, bromo, fluoro, hydroxy, $C_1$–$C_4$-alkoxy, phenoxy, phenyl-$C_1$–$C_2$-alkoxy, phenyl, or any of the last three named substituents further substituted by chloro, bromo, fluoro, $C_1$–$C_4$-alkyl or $C_1$–$C_4$-alkoxy;

$R_2$ and $R_3$, independently of each other are hydrogen, $C_1$–$C_5$-alkyl, or $C_1$–$C_5$-alkyl substituted cy $C_1$–$C_4$-alkoxy, $C_1$–$C_4$-alkyl mercapto, fluoro, chloro, bromo, $C_2$–$C_5$-alkylcarbonyl, $C_2$–$C_5$-alkoxycarbonyl, phenylcarbonyl, phenyl, phenoxy, benzyloxy, or any othe the last three named substituents further substituted by $C_1$–$C_4$-alkyl, $C_1$–$C_4$-alkoxy, chloro, fluoro, or bromo;

$R_2$ and $R_3$, when joined together are a nonaromatic carbocycle of 5-7 members or heterocycle of 5–7 members wherein the heterocycle is formed of not more than one heteroatom from the group consisting of oxygen and sulfur, with the remaining members of the heterocycle being carbon;

$X_1$ and $X_2$, independently of each other, are oxygen or sulfur; and $Z_1$ and $Z_2$, independently of each other, are hydrogen, fluoro, chloro, or bromo.

2. The anthraquinone dyestuff of claim 1 of the formula

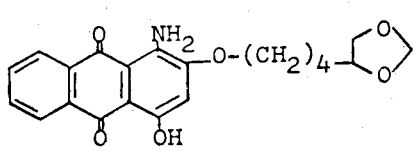

3. The anthraquinone dyestuff of claim 1 of the formula

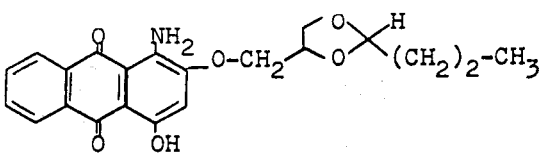

4. The anthraquinone dyestuff of claim 1 of the formula

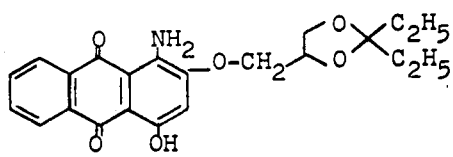

5. The anthraquinone dyestuff of claim 1 of the formula

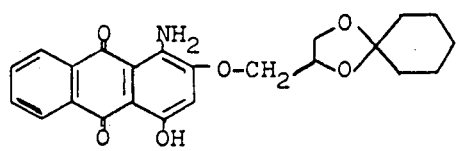

6. The anthraquinone dyestuff of claim 1 of the formula

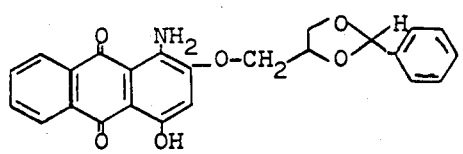

7. The anthraquinone dyestuff of claim 1 of the formula

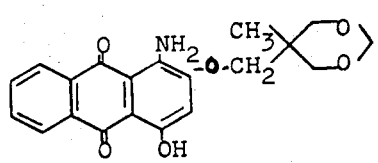

8. The anthraquinone dyestuff of claim 1 of the formula

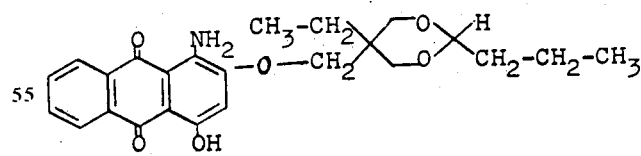

9. Anthraquinone dyestuff of claim 1 wherein $X_1$ and $X_2$ are oxygen.

10. Anthraquinone dyestuff of the formula

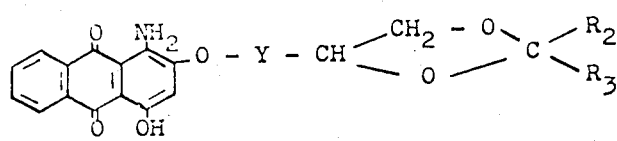

wherein

Y, $R_2$ and $R_3$ are defined as set forth in claim 1.

11. Anthraquinone dyestuff of the formula

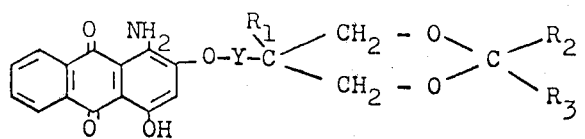

wherein

Y, $R_1$, $R_2$ and $R_3$ are defined as set forth in claim 1.

12. Anthraquinone dyestuff of claim 11 wherein
Y is $C_1$-$C_4$-alkylene and
$R_2$ and $R_3$, independently of each other, are hydrogen, $C_1$-$C_4$-alkyl, or phenyl; and $R_2$ and $R_3$, when joined together, are —$(CH_2)_4$— or —$(CH_2)_5$—.

13. Anthraquinone dyestuff of claim 11 wherein
Y is $C_1$-$C_4$-alkylene,
$R_1$ is hydrogen, methyl, or ethyl; and
$R_2$ and $R_3$ independently of each other, are hydrogen, $C_1$-$C_4$-alkyl, or phenyl; and $R_2$ and $R_3$, when joined together, are —$(CH_2)_4$— or —$(CH_2)_5$—.

* * * * *